United States Patent
Yamasaki

(10) Patent No.: US 10,996,319 B2
(45) Date of Patent: May 4, 2021

(54) DISTANCE MEASURING SYSTEM AND CONTROL METHOD OF DISTANCE MEASURING SYSTEM

(71) Applicant: CANON KABUSHIKI KAISHA, Tokyo (JP)

(72) Inventor: Takahiro Yamasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 413 days.

(21) Appl. No.: 16/007,394

(22) Filed: Jun. 13, 2018

(65) Prior Publication Data
US 2018/0364331 A1 Dec. 20, 2018

(30) Foreign Application Priority Data
Jun. 20, 2017 (JP) .............................. JP2017-120249

(51) Int. Cl.
G01S 7/48 (2006.01)
G01S 7/489 (2006.01)
(Continued)

(52) U.S. Cl.
CPC ............ G01S 7/4808 (2013.01); B60R 11/04 (2013.01); G01S 7/4861 (2013.01); G01S 7/4865 (2013.01);
(Continued)

(58) Field of Classification Search
CPC ...... G01S 7/4808; G01S 17/89; G01S 7/4865; G01S 13/931; G01S 17/58; G01S 13/345; G01S 13/584; G01S 7/4861; G01S 17/10; G01S 7/497; G01S 17/34; G01S 17/931; G01S 2013/9232; G01S 2013/93271; G01S 2013/93273; G01S 17/894; H04N 13/239; H04N 13/296; H04N 13/254; H04N 2013/0081; H04N 5/232411; B60R 11/04; B60R 2300/301; B60R 2300/107
(Continued)

(56) References Cited

U.S. PATENT DOCUMENTS

2018/0052457 A1* 2/2018 Kim ..................... H04N 13/296

FOREIGN PATENT DOCUMENTS

JP H11-110530 4/1999
JP 2002-171438 6/2002
(Continued)

*Primary Examiner* — Daniel L Murphy
(74) *Attorney, Agent, or Firm* — Venable LLP

(57) ABSTRACT

A distance measuring system and a controlling method of the system can reduce power consumption of a distance measuring apparatus acquiring an image including distance information. For example, the distance measuring system includes a distance measuring apparatus acquiring distance information concerning an image capturing target, a calculating unit estimating an estrangement period in which the image capturing target cannot be recognized in an image, based on the distance information, and a controlling unit setting the distance measuring apparatus to a power saving mode of controlling an acquiring frequency of the image according to the estrangement period when the estrangement period is a first threshold value or more, and setting the distance measuring apparatus to a normal mode of controlling the acquiring frequency of the image independently from the estrangement period when the estrangement period is less than the first threshold value.

15 Claims, 23 Drawing Sheets

(51) Int. Cl.
| | |
|---|---|
| G01S 17/32 | (2020.01) |
| G01S 17/89 | (2020.01) |
| G01S 7/4865 | (2020.01) |
| H04N 13/239 | (2018.01) |
| B60R 11/04 | (2006.01) |
| G01S 13/931 | (2020.01) |
| G01S 17/58 | (2006.01) |
| G01S 13/34 | (2006.01) |
| G01S 13/58 | (2006.01) |
| G01S 7/4861 | (2020.01) |
| G01S 17/10 | (2020.01) |
| G01S 7/497 | (2006.01) |
| H04N 13/296 | (2018.01) |
| H04N 13/254 | (2018.01) |
| G01S 17/34 | (2020.01) |
| G01S 17/931 | (2020.01) |
| G01S 17/894 | (2020.01) |
| H04N 13/00 | (2018.01) |
| H04N 5/232 | (2006.01) |

(52) U.S. Cl.
CPC ........... *G01S 7/497* (2013.01); *G01S 13/345* (2013.01); *G01S 13/584* (2013.01); *G01S 13/931* (2013.01); *G01S 17/10* (2013.01); *G01S 17/34* (2020.01); *G01S 17/58* (2013.01); *G01S 17/894* (2020.01); *G01S 17/931* (2020.01); *H04N 13/239* (2018.05); *H04N 13/254* (2018.05); *H04N 13/296* (2018.05); B60R 2300/107 (2013.01); B60R 2300/301 (2013.01); G01S 2013/9323 (2020.01); G01S 2013/93271 (2020.01); G01S 2013/93273 (2020.01); H04N 5/232411 (2018.08); H04N 2013/0081 (2013.01)

(58) Field of Classification Search
USPC .................................................. 356/4.01
See application file for complete search history.

(56) References Cited

FOREIGN PATENT DOCUMENTS

| | | |
|---|---|---|
| JP | 2006-322834 | 11/2006 |
| JP | 2008-241535 | 10/2008 |
| JP | 2011-185664 | 9/2011 |

\* cited by examiner

FIG. 4A
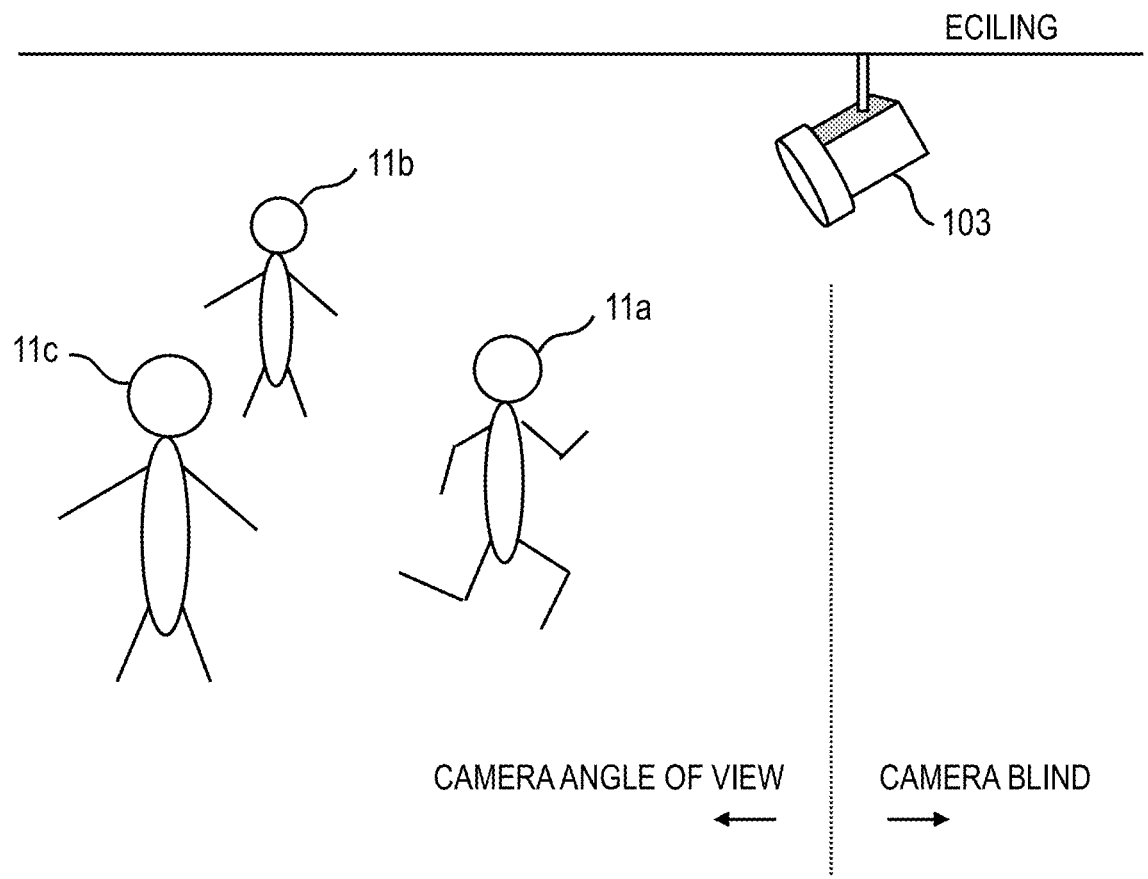
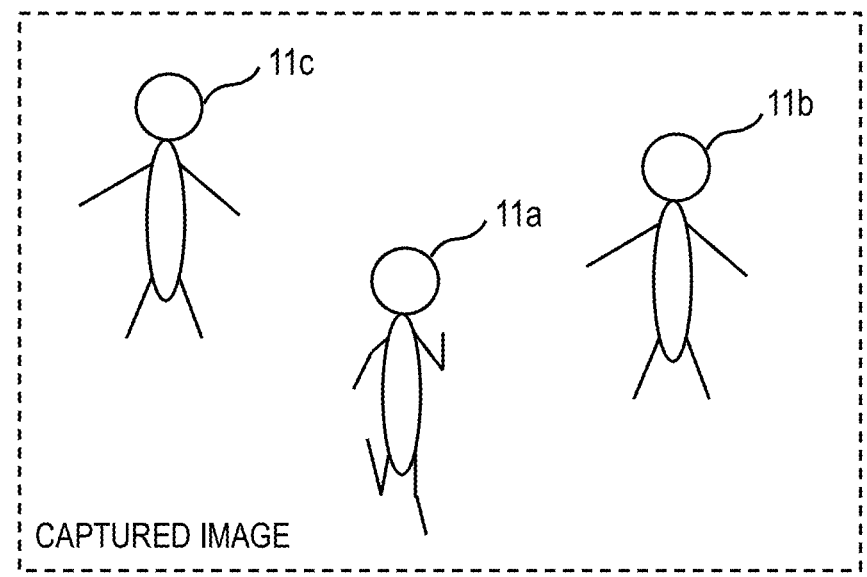

FIG. 4B
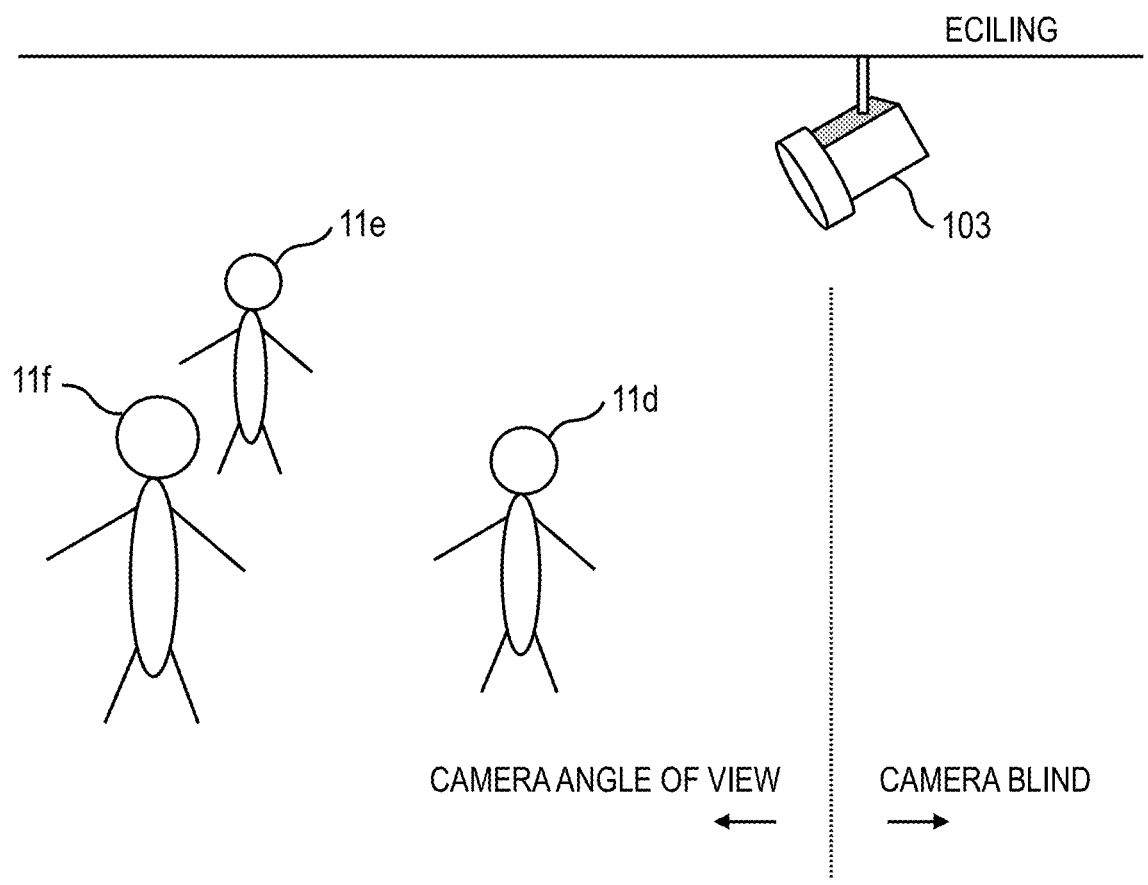
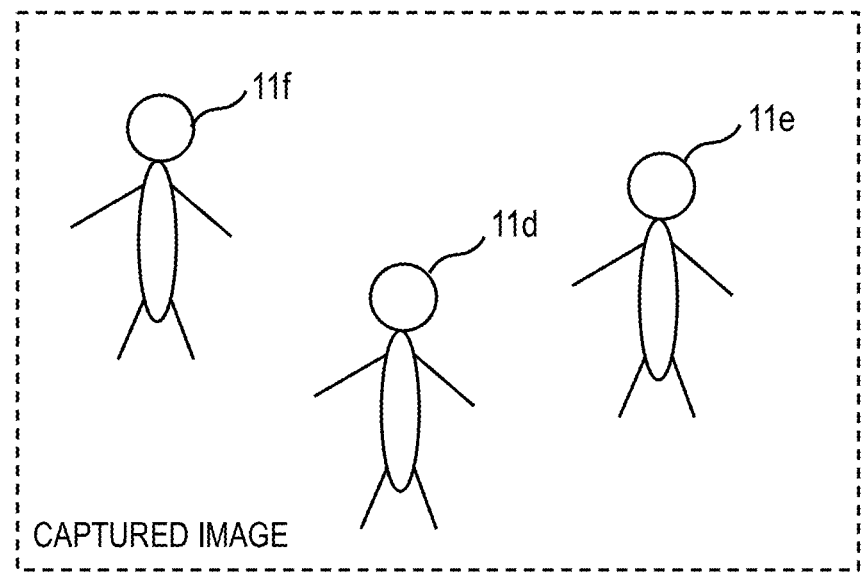

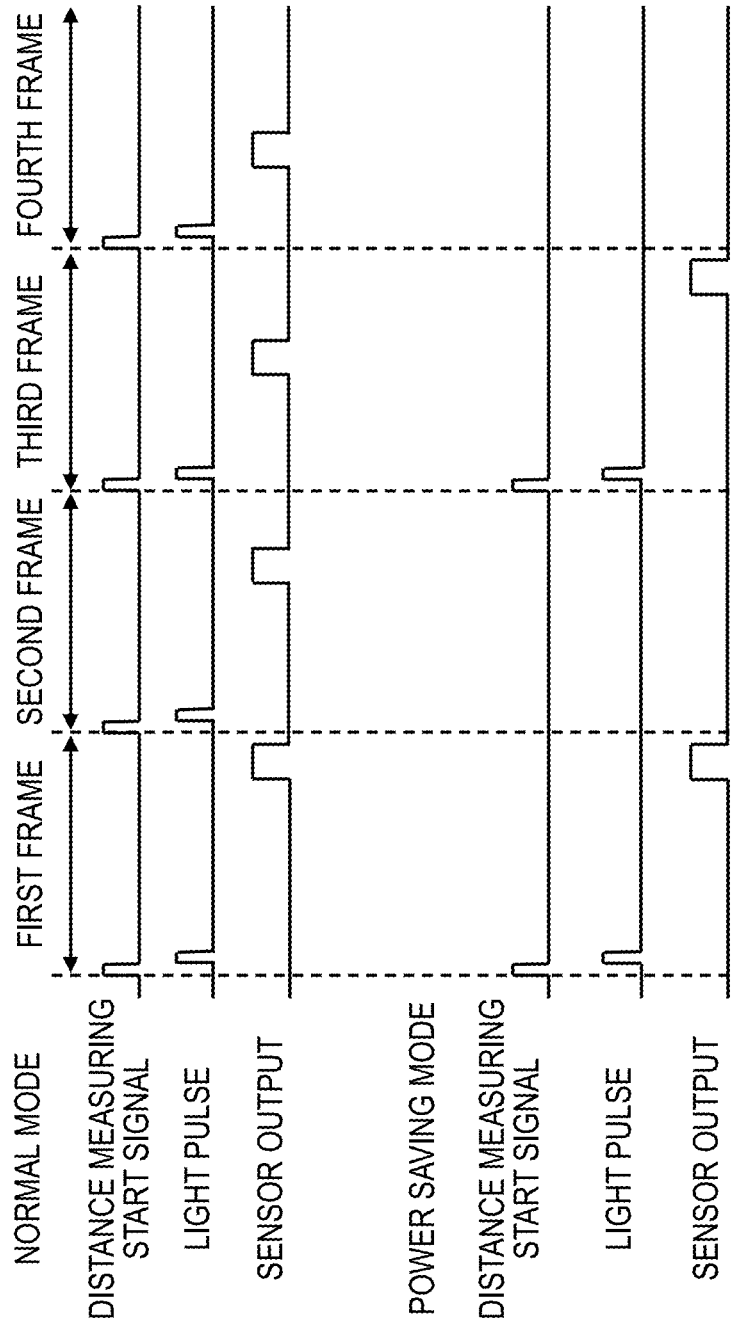

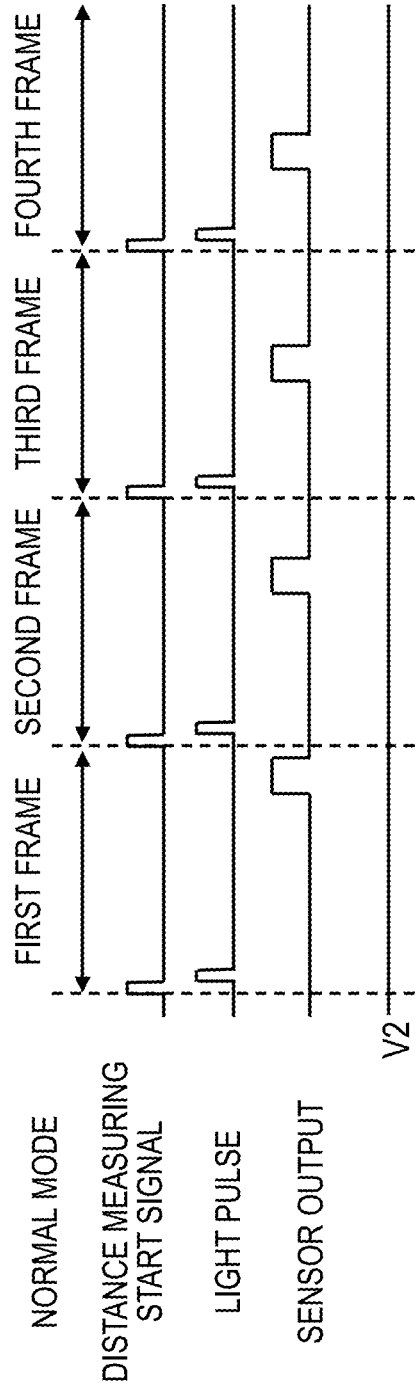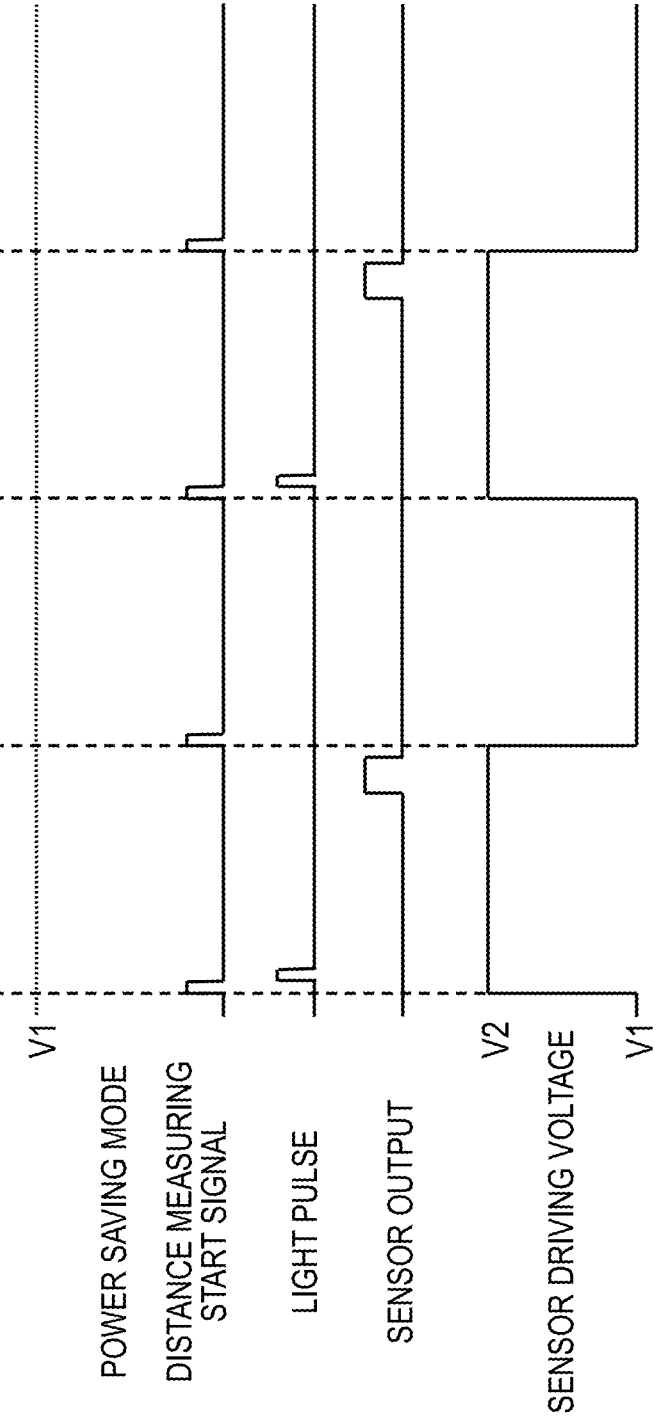
FIG. 10A
FIG. 10B

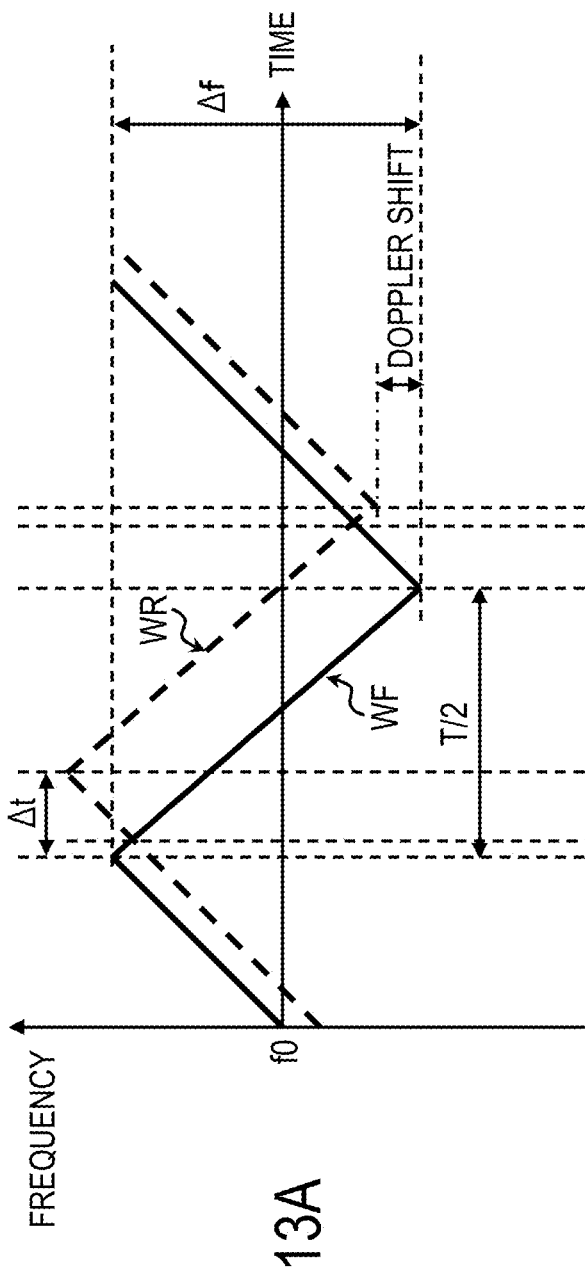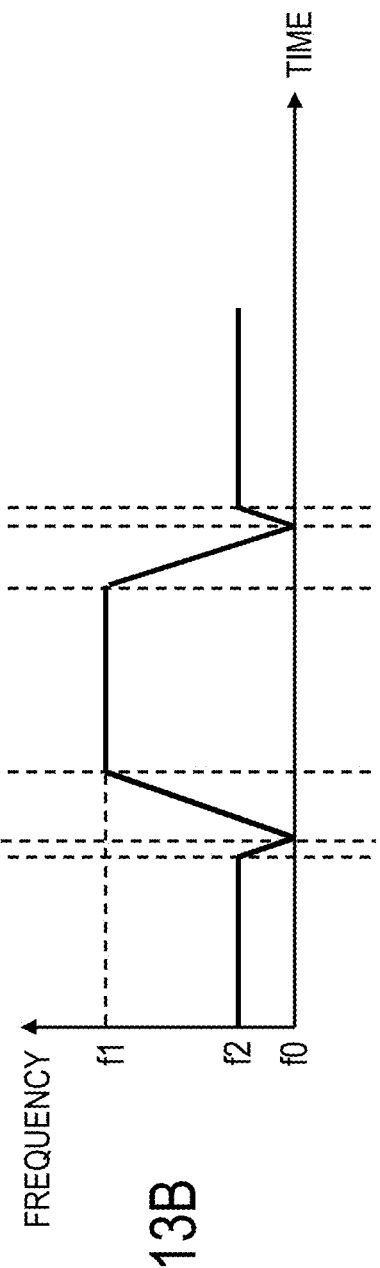

DISTANCE MEASURING SYSTEM AND CONTROL METHOD OF DISTANCE MEASURING SYSTEM

BACKGROUND OF THE INVENTION

Field of the Invention

The present invention relates to a technique of reducing power consumption in a distance measuring system.

Description of the Related Art

In recent years, a technique of generating a three-dimensional image by acquiring distance information to an image capturing target by using a distance measuring camera or the like, and combining the acquired distance information with a two-dimensional image has been realized. The distance measuring technique like this is expected to be applied to object recognition by machine vision of a robot or the like, a drone-mounted camera, an automatic driving system and the like.

In order to further enhance distance measuring precision in a distance measuring system, it is effective to use a plurality of distance measuring apparatuses differing in distance measuring method, in combination. However, combined use of a plurality of distance measuring apparatuses increases a generation load and a processing load of an image including distance information, and causes an increase in power consumption. Therefore, in Japanese Patent Application Laid-Open No. 2011-185664, a processing load in detection of a target object by using a distance image is reduced by reducing an information amount while information for determining whether it is an object or not is kept.

SUMMARY OF THE INVENTION

The technique described in Japanese Patent Application Laid-Open No. 2011-185664 can reduce the processing load of an image by reducing the data amount in the distance measuring system, but can hardly reduce the load at the time of generating an image including distance information by driving the distance measuring apparatus. Therefore, an object of the present invention is to provide a distance measuring system that can reduce power consumption of a distance measuring apparatus that acquires an image including distance information and a control method of the distance measuring system.

According to one aspect of the present invention, a distance measuring system is provided, which includes a distance measuring apparatus that acquires distance information concerning an image capturing target, a calculating unit that estimates an estrangement period in which the image capturing target cannot be recognized in an image, based on the distance information, and a controlling unit that sets the distance measuring apparatus to a power saving mode of controlling an acquiring frequency of the image according to the estrangement period when the estrangement period is a first threshold value or more, and sets the distance measuring apparatus to a normal mode of controlling the acquiring frequency of the image independently from the estrangement period when the estrangement period is less than the first threshold value.

According to another aspect of the present invention, a control method is provided, which is a control method of a distance measuring system including a distance measuring apparatus that acquires distance information concerning an image capturing target, including a calculating step of estimating an estrangement period in which the image capturing target cannot be recognized in an image, based on the distance information, and a controlling step of setting the distance measuring apparatus to a power saving mode of controlling an acquiring frequency of the image according to the estrangement period when the estrangement period is a first threshold value or more, and setting the distance measuring apparatus to a normal mode of controlling the acquiring frequency of the image independently from the estrangement period, when the estrangement period is less than the first threshold value.

According to the present invention, the distance measuring system that can reduce power consumption of the distance measuring apparatus which acquires an image including distance information, and the control method of the distance measuring system can be provided.

Further features of the present invention will become apparent from the following description of exemplary embodiments with reference to the attached drawings.

BRIEF DESCRIPTION OF THE DRAWINGS

FIG. 4A is a first view illustrating an application example of the distance measuring system according to the first embodiment.

FIG. 4B is a second view illustrating an application example of the distance measuring system according to the first embodiment.

FIGS. 9A and 9B are first timing charts schematically illustrating an operation of a distance measuring apparatus according to the second embodiment.

FIGS. 10A and 10B are second timing charts schematically illustrating an operation of the distance measuring apparatus according to the second embodiment.

FIGS. 13A and 13B are second diagrams illustrating a method for measuring the distance to the image capturing target by the FMCW method.

DESCRIPTION OF THE EMBODIMENTS

Preferred embodiments of the present invention will now be described in detail in accordance with the accompanying drawings.

First Embodiment

Figure 1:
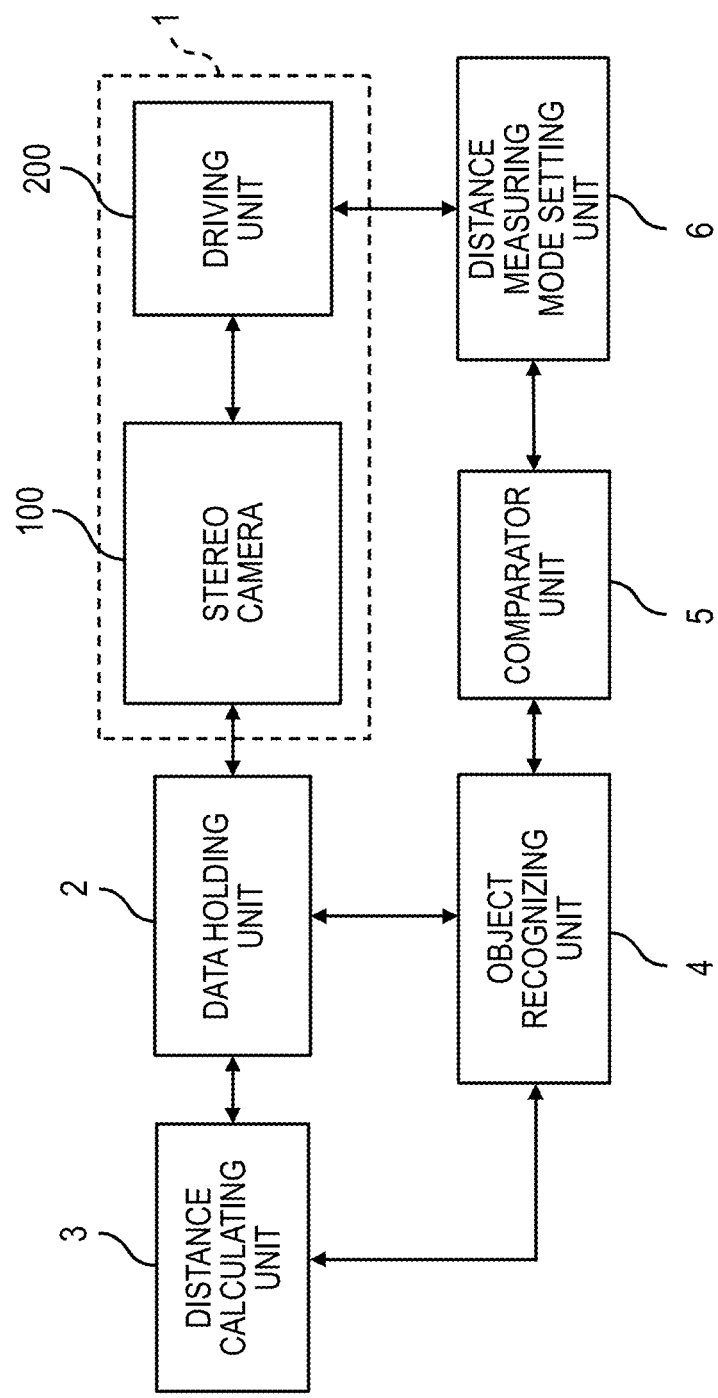
FIG. 1 is a block diagram schematically illustrating a configuration of a distance measuring system according to a first embodiment.

FIG. 1 is a block diagram schematically illustrating a configuration of a distance measuring system according to a first embodiment. The distance measuring system of the present embodiment has a distance measuring apparatus 1, a data holding unit 2, a distance calculating unit 3, an object recognizing unit 4, a comparator unit 5 and a distance measuring mode setting unit 6. Here, the distance measuring apparatus 1 has a stereo camera 100 and a driving unit 200. Hereinafter, specific operations of these components will be described with use of FIG. 2.

Figure 2:
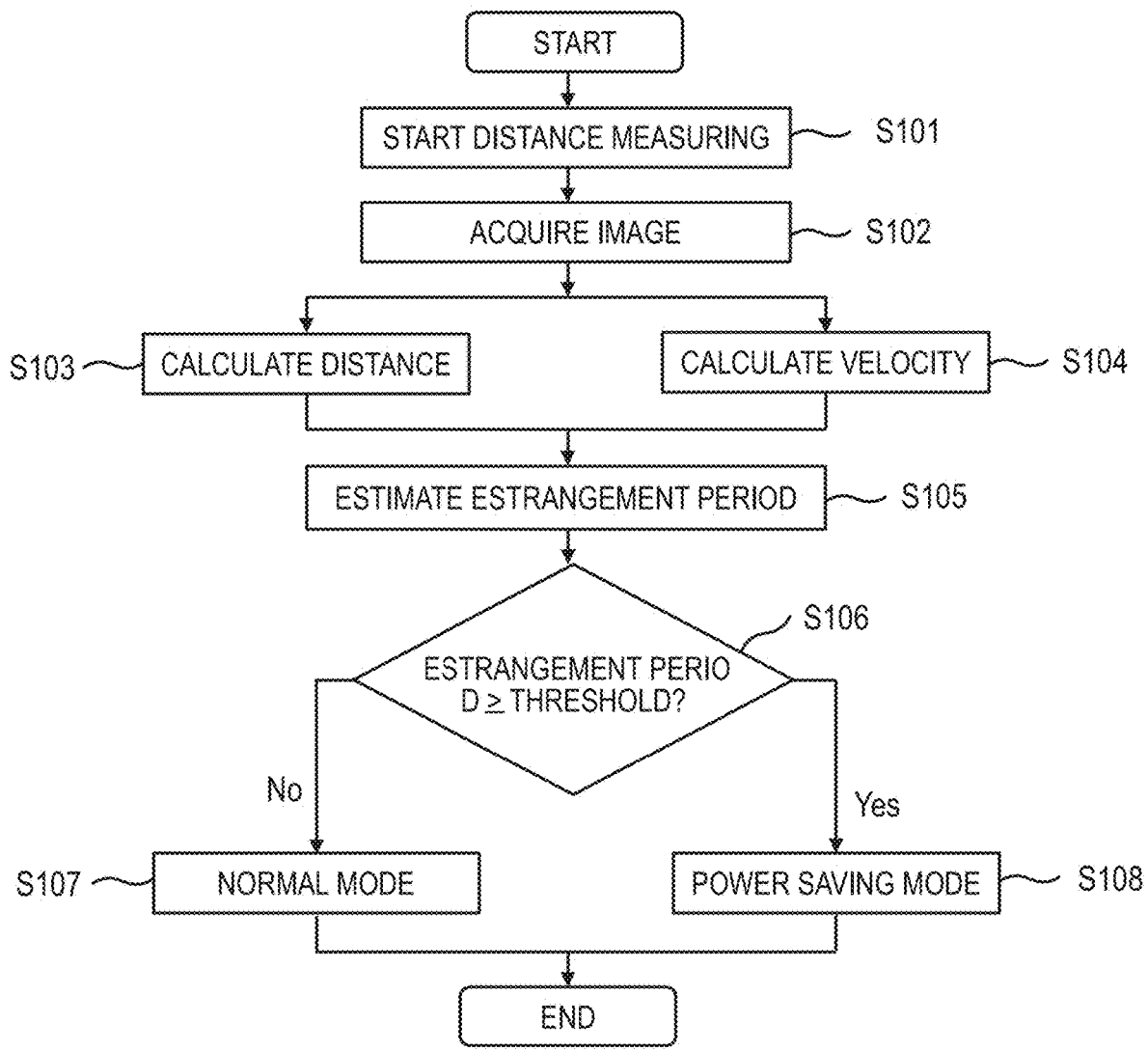
FIG. 2 is a flowchart illustrating a control method of the distance measuring system according to the first embodiment.

FIG. 2 is a flowchart illustrating a control method of the distance measuring system according to the first embodiment. In step S101, the driving unit 200 starts a distance measuring operation by driving the stereo camera 100. At this time, a period or the like in which the driving unit 200 drives the stereo camera 100 is set by the distance measuring mode setting unit 6. In step S102, the stereo camera 100 acquires an image including distance information to an image capturing target by using parallax. A distance measuring method using parallax will be described thereafter by using FIGS. 3A and 3B.

Thereafter, the distance measuring apparatus 1 stores the image including the distance information in the data holding unit 2. The data holding unit 2 may be capable of writing/reading data like a semiconductor memory, an HDD, an SSD and the like, for example. In step S103, the distance calculating unit 3 calculates a distance from the distance measuring apparatus 1 to the image capturing target based on the distance information included in the image held by the data holding unit 2. Further, in step S104, the object recognizing unit 4 calculates a velocity of the image capturing target based on the distance to the image capturing target, which is calculated by the distance calculating unit 3.

For example, the moving velocity of the image capturing target can be calculated by dividing a distance by which the image capturing target moves on a series of frame images captured in a predetermined period by an image capturing period. Here, the distance by which the image capturing target moves on the frame images is calculated based on a distance to the image capturing target, which is calculated by the distance calculating unit 3. At this time, the distance measuring apparatus 1 may move with respect to the image capturing target, as described in a fifth to a seventh embodiments that will be described later. In this case, a relative velocity of the image capturing target to the distance measuring apparatus 1 is calculated. Note that the method for obtaining the velocity of the image capturing target is not limited to the aforementioned method, but the velocity may be obtained by another method.

Even when a plurality of image capturing targets are present in an image, the object recognizing unit 4 can recognize the respective image capturing targets separately, and obtain the velocities of the respective image capturing targets. Further, the object recognizing unit 4 may have a function of feeding back information concerning the recognized image capturing target to the distance calculating unit 3, and calculating distance information of only a specific image capturing target, and the like.

In step S105, the comparator unit 5 estimates an estrangement period until the image capturing target cannot be recognized in a field region of view of the stereo camera 100 based on information including the distance and the velocity of the image capturing target which are calculated in the distance calculating unit 3 and the object recognizing unit 4. The estrangement period is estimated as a time period until the image capturing target cannot be recognized by the distance measuring apparatus 1 by moving close to the stereo camera 100 to hide in a camera blind, or moving away from the stereo camera 100, for example.

In step S106, the comparator unit 5 determines whether or not the estrangement period estimated in step S105 is a predetermined first threshold value or more. When the estrangement period is the first threshold value or more (Yes), the flow goes to step S108, and when the estrangement period is less than the first threshold value (No), the flow goes to step S107. Here, as the first threshold value, different values may be set according to kinds of situations where the image capturing target cannot be recognized. For example, different first threshold values may be set respectively in a case where the image capturing target is close to the stereo camera 100, and a case where the image capturing target is away from the stereo camera 100.

In step S107, the distance measuring mode setting unit 6 determines that the image capturing target is becoming unrecognizable in the field region of view of the stereo camera 100. Subsequently, the distance measuring mode setting unit 6 keeps an operation mode of the distance measuring apparatus 1 as it is in a normal mode. In the normal mode, an acquiring frequency of an image including distance information is set at a relatively high frequency independently from the estrangement period estimated in step S105. As a result, for example, when the image capturing target is moving fast in the field region of view, the image of the image capturing target can be sufficiently kept until the image capturing target cannot be recognized in the field region of view.

In step S108, the distance measuring mode setting unit 6 determines that there is no risk of the image capturing target becoming unrecognizable immediately in the field region of view of the stereo camera 100. Subsequently, the distance measuring mode setting unit 6 sets the operation mode of the distance measuring apparatus 1 to a power saving mode. In the power saving mode, the acquiring frequency of the image including the distance information is set at a relatively slow frequency according to the estrangement period estimated in step S105. More specifically, the driving frequency of the stereo camera 100 is made slower than the driving frequency of the stereo camera 100 in the normal mode, and on and off of driving of the stereo camera 100 are alternately switched in a predetermined period.

For example, when the image capturing target moves slowly in the field region of view, there is a time period until the image capturing target cannot be recognized in the field region of view, so that even when the operation mode of the distance measuring apparatus 1 is set to the power saving mode, the image of the image capturing target can be sufficiently kept. As a result, in the power saving mode, not only a processing load of the image including the distance information, but also a load of generating the image including the distance information by driving the distance measuring apparatus 1 are reduced.

Figure 3A:
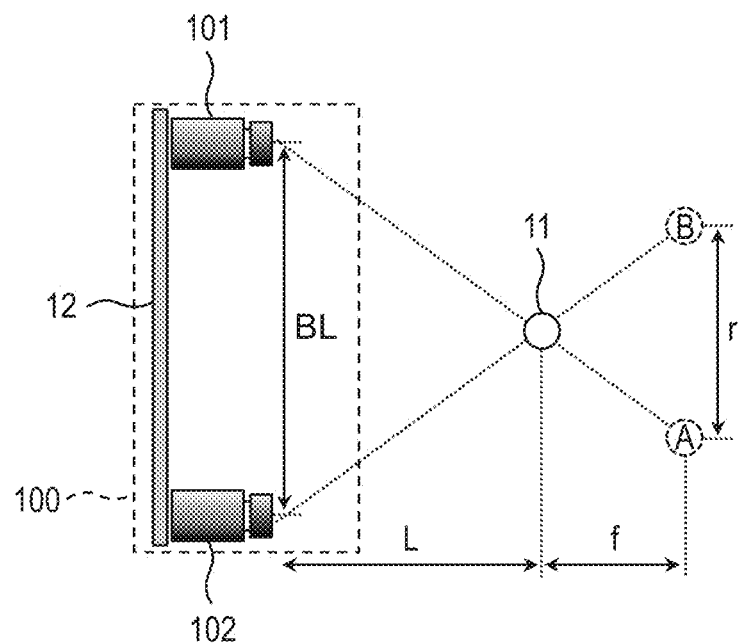
FIGS. 3A and 3B are diagrams illustrating an example of a method for acquiring distance information to an image capturing target by using parallax.
Figure 3B:
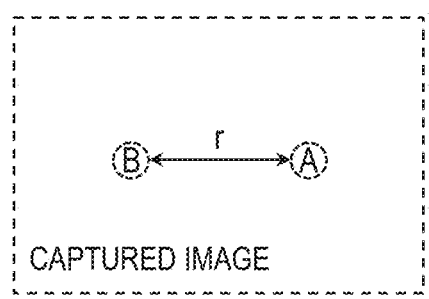

FIGS. 3A and 3B are diagrams illustrating an example of a method for acquiring distance information to an image capturing target 11 by using parallax. The stereo camera 100 has two cameras 101 and 102 that are fixed to a fixing section 102. The camera 101 and the camera 102 are disposed apart from each other by a distance of a baseline length BL. Thereby, as illustrated in FIG. 3A, a position of the image capturing target 11 at a time of the image capturing target 11 seen from the camera 101 becomes a point A, and the position of the image capturing target 11 at a time of the image capturing target 11 seen from the camera 102 becomes a point B.

A difference between the apparent positions of the image capturing target 11 is observed as parallax by the stereo camera 100. The parallax is due to the baseline length BL which is a space between the two cameras 101 and 102. A distance L from the distance measuring apparatus 1 to the image capturing target 11 is obtained by expression (1) as follows by using a focal length f of an optical system of the stereo camera 100, and a distance r between the point A and the point B.

$$L=(BL)f/r \qquad (1)$$

From the above expression (1), it is found that as the baseline length BL is longer, the distance L to the image capturing target 11 which is more distant can be measured. Note that while FIGS. 3A and 3B illustrate the example of the case where the stereo camera 100 is configured by the two cameras 101 and 102, it is possible to configure the stereo camera 100 by one camera if only the baseline length BL between pixels of the image sensor in the camera can be sufficiently ensured. Further, while FIGS. 3A and 3B illustrate the example of the case where the cameras 101 and 102 and the image capturing target 11 are located on a same plane, the distance L to the image capturing target 11 can be also obtained by using a similar method even when they are located on a three-dimensional shape, although calculation is complicated.

FIG. 4A and FIG. 4B are views illustrating application examples of the distance measuring system according to the first embodiment. FIG. 4A illustrates an example of a case where the estrangement period estimated in step S105 in FIG. 2 is less than a first threshold value. Image capturing targets 11a, 11b and 11c are present in a field region of view (a camera angle of view) of a surveillance camera 103 to which the distance measuring system of the present embodiment is applied. Here, it is assumed that the image capturing target 11a is a person related to crime and the like and is running away.

A moving velocity of the image capturing target 11a who is running away is high, so that the image capturing target 11a enters camera blind of the surveillance camera 103 faster than the other image capturing targets 11b and 11c, and is not recognized in an image captured by the surveillance camera 103. The image capturing target 11a at a high moving velocity like this is highly likely to be a cautionary person, so that in a situation as illustrated in FIG. 4A, it is desirable to keep the acquiring frequency of images high in order to keep sufficient image information such as a physiognomy and behaviors of the image capturing target 11a.

FIG. 4B illustrates an example of a case where the estrangement period estimated in step S105 in FIG. 2 is the first threshold value or more. Image capturing targets 11d, 11e and 11f are present in the field region of view (the camera angle of view) of the surveillance camera 103 to which the distance measuring system of the present embodiment is applied. The image capturing targets 11d, 11e and 11f are not related to crime and the like, and are walking slowly in the field region of view of the surveillance camera 103.

Moving velocities of the image capturing targets 11d, 11e and 11f are all low, so that there is no risk that the image capturing targets 11d, 11e and 11f become unrecognizable immediately in image captured by the surveillance camera 103. Consequently, even if the acquiring frequency of the image is made slow, it is possible to keep sufficient image information such as physiognomies and behaviors of the image capturing targets 11d, 11e and 11f. In contrast with this, it is not desirable to keep the acquiring frequency of images high in the situation as illustrated in FIG. 4B, because electric power to acquire and generate an image including distance information is consumed more than necessary.

Therefore, a calculating unit (the distance calculating unit 3, the object recognizing unit 4) of the distance measuring system of the present embodiment estimates the estrangement period of the image capturing target 11 until the image capturing target 11 cannot be recognized in the image, based on the distance and the velocity of the image capturing target 11. Subsequently, when the estrangement period is the predetermined first threshold value or more, a controlling unit (the comparator unit 5, the distance measuring mode setting unit 6) of the distance measuring system of the present embodiment makes the acquiring frequency of the image lower than the acquiring frequency in the normal mode to set the distance measuring apparatus 1 to the power saving mode.

More specifically, the controlling unit makes the driving frequency of the distance measuring apparatus 1 in the power saving mode slower than the driving frequency of the distance measuring apparatus 1 in the normal mode. Alternatively, in the power saving mode, on and off of driving of the distance measuring apparatus 1 are alternately switched in a predetermined period. Thereby, it can reduce power consumption of the distance measuring apparatus 1 that acquires the distance information to the image capturing target 11 while keeping sufficient image information such as physiognomies and behaviors of the image capturing targets 11d, 11e and 11f.

As described above, the estrangement period of the image capturing target 11 is estimated as the time period until the image capturing target 11 moves close to the stereo camera 100 to hide in the camera blind or the image capturing target 11 moves away from the stereo camera 100 and cannot be recognized by the distance measuring apparatus 1, for example. Here, as the first threshold value, different values may be set according to kinds of situations where the image capturing target 11 cannot be recognized.

Note that the distance measuring system of the present embodiment may have an image capturing apparatus for capturing an image that includes no distance information, besides the stereo camera 100. Further, the distance measuring system may have an image recognizing system that automatically detects a person, and may further have a function of automatically following the person so that the person is in the field region of view of the surveillance camera 103.

Second Embodiment

Figure 5:
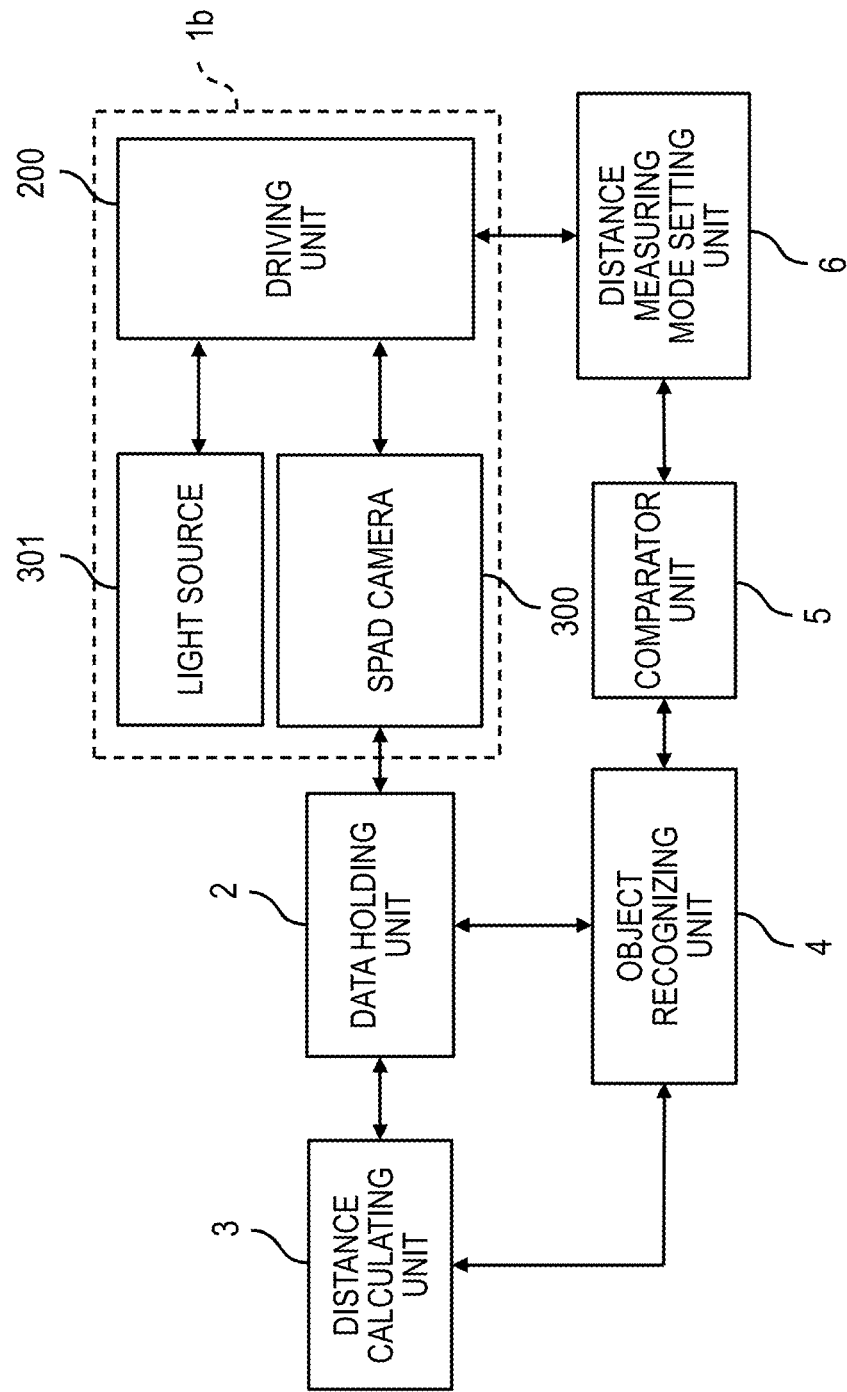
FIG. 5 is a block diagram schematically illustrating a configuration of a distance measuring system according to a second embodiment.

FIG. 5 is a block diagram schematically illustrating a configuration of a distance measuring system according to a second embodiment. The distance measuring system of the present embodiment illustrated in FIG. 5 differs from the distance measuring system of the first embodiment illustrated in FIG. 1 mainly in configuration of a distance measuring apparatus 1b. The distance measuring apparatus 1b of the present embodiment has a SPAD (Single Photon Avalanche Diode) camera 300, a light source 301, and a driving unit 200. The other components are substantially the same as those in the first embodiment. Further, a control method of the distance measuring system of the present embodiment is also substantially the same as the control method in the flowchart of the first embodiment illustrated in FIG. 2, except that a distance measuring method of the distance measuring apparatus 1b differs from the distance measuring method in the first embodiment. Hereinafter, a difference from the first embodiment will be mainly described.

The light source 301 emits a light pulse to the image capturing target 11. The SPAD camera 300 is a single-lens distance measuring camera capable of acquiring an image including distance information, and uses a TOF (Time-of-flight) method as the distance measuring method. That is, the SPAD camera 300 measures a delay time period until the light pulse that is emitted from the light source 301 is reflected by the image capturing target 11 and returns, and calculates a distance from the distance measuring apparatus 1b to the image capturing target 11. The driving unit 200 drives the light source 301 and the SPAD camera 300.

Figure 6A:
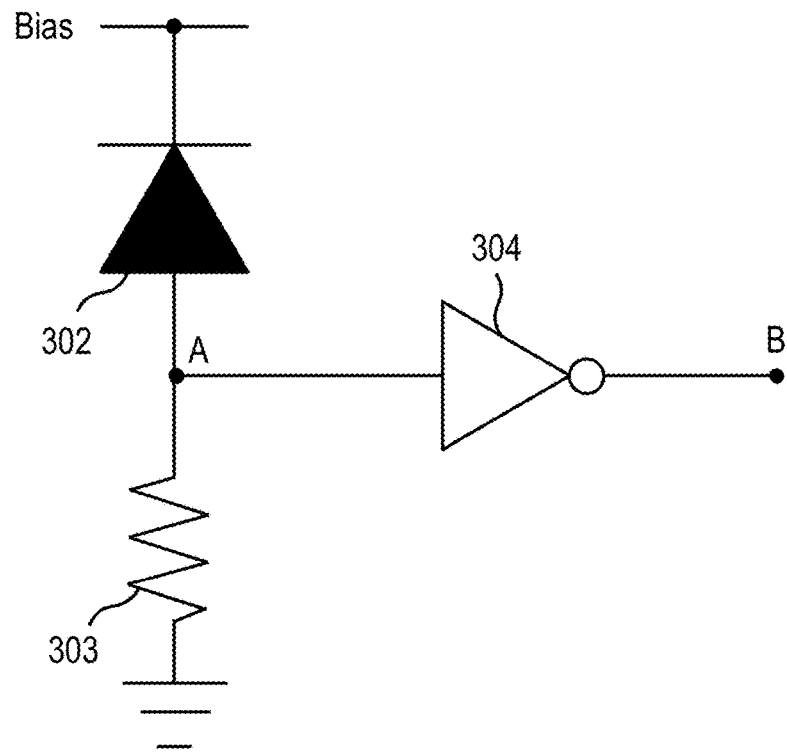
FIGS. 6A and 6B are diagrams schematically illustrating a configuration and an operation of a SPAD sensor of one pixel.
Figure 6B:
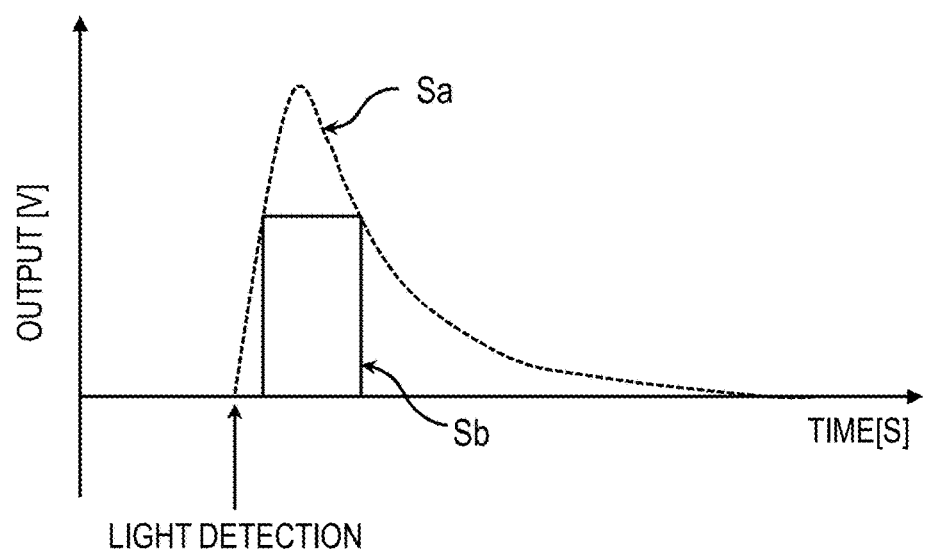

Hereinafter, the SPAD camera 300 will be described. The SPAD camera 300 contains a SPAD sensor, and outputs a number of detected photons as a digital value. FIGS. 6A and 6B are diagrams schematically illustrating a configuration and an operation of the SPAD sensor of one pixel. FIG. 6A illustrates an equivalent circuit of the SPAD sensor. The SPAD sensor has a photodiode 302 for detecting photons, a quench resistance 303 for converting an avalanche current into a voltage, and an inverter 304 for subjecting a signal that is voltage-converted to waveform shaping.

A reverse bias Bias is applied to a PN junction of a photodiode 302 until a state immediately before avalanche amplification called a Geiger mode occurs is brought about. In a photoelectric conversion element that is used in an ordinary capturing apparatus, one electron is excited from a valence band to a conduction band and is detected, when one photon is incident, whereas in the SPAD sensor, hundreds of thousands of electrons are generated by avalanche amplification when one photon is incident. Consequently, in the SPAD sensor, it is possible to detect photons on a unit basis.

FIG. 6B illustrates output waveforms Sa and Sb in points A and B in FIG. 6A respectively. The avalanche current that is generated by photons being incident on the photodiode 302 is converted into a voltage by the quench resistance 303. The output waveform Sa in the point A between the photodiode 302 and the quench resistance 303 is caused to pass through the inverter 304, and thereby is shaped into a pulse waveform like the output waveform Sb illustrated in FIG. 6B to be output to the point B. Widths of the output waveforms Sa and Sb are determined by a capacity of the photodiode 302 and a time constant of the quench resistance 303. A time period determined by the time constant is called a dead time (recovery time), and the SPAD sensor cannot detect photons which are incident during the dead time.

Figure 7:
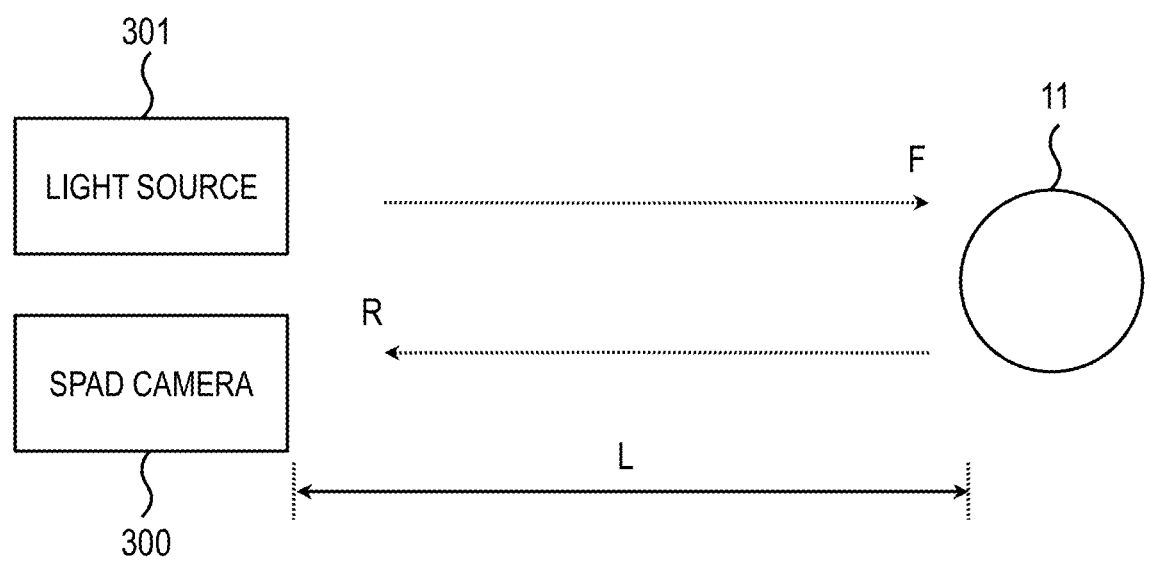
FIG. 7 is a first diagram illustrating a method for measuring a distance to an image capturing target by a TOF method.
Figure 8:
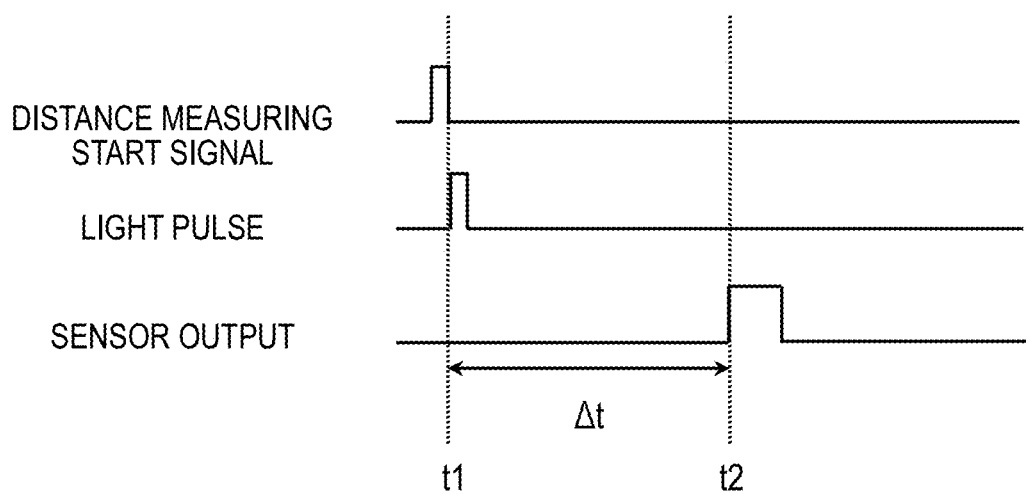
FIG. 8 is a second diagram illustrating a method for measuring the distance to the image capturing target by the TOF method.

FIG. 7 and FIG. 8 are diagrams illustrating a method for measuring a distance to the image capturing target 11 by the TOF method. As illustrated in FIG. 7, the light source 301 emits the optical pulse F toward the image capturing target 11. The SPAD camera 300 detects a reflected light R reflected by the image capturing target 11.

FIG. 8 illustrates a timing chart from start of distance measurement to light detection. When a distance measurement starting signal of the distance measuring system is output before a time t1, the distance measuring apparatus 1 starts a distance measuring operation synchronously with the distance measurement starting signal. At the time t1, the light source 301 emits the light pulse F toward the image capturing target 11. Emission timing of the light pulse F may be the same timing as output timing of the distance measurement starting signal. At a time t2, the SPAD camera 300 detects the reflected light R reflected by the image capturing target 11 to output a sensor output.

Since a velocity c[m/s] of light is constant, the distance L from the distance measuring apparatus 1b to the image capturing target 11 is obtained by expression (2) as follows by measuring a time difference $\Delta t[s]$ from the time t1 at which the light pulse F is emitted to the time t2 at which the reflected light R is detected.

$$L = c\Delta t/2 \qquad (2)$$

When the image capturing target 11 moves relatively to the distance measuring apparatus 1, the light pulse F is emitted in a predetermined period T[s] to measure a change in the distance L to the image capturing target 11, and thereby the velocity v[m/s] of the image capturing target 11 is obtained. For example, when the image capturing target 11 moves by $\Delta L[m]$ during one period T[s] of the light pulse F, the velocity v[m/s] of the image capturing target 11 is obtained by expression (3) as follows. In practice, a velocity vector in a three-dimensional space is calculated.

$$v = \Delta L/T \qquad (3)$$

In a direct TOF measurement method using a SPAD sensor, photons that are incident on the SPAD sensor can be detected by being converted into digital values at a high speed, so that it is possible to obtain high distance precision. For example, when measurement time resolving power of the light pulse F is 6.6 [ps], distance resolution power corresponding to 1 [mm] can be obtained. By measuring and recognizing the image capturing target 11 at a high speed with high precision by using the SPAD sensor, the distance measuring apparatus 1b can be operated at a high speed with high precision.

Note that in FIG. 7 and FIG. 8, the distance measuring method by the TOF method using the SPAD sensor of one pixel is described, but it is possible to acquire an image of the image capturing target 11 as a two-dimensional image by arranging a plurality of SPAD sensors two-dimensionally.

FIGS. 9A and 9B and FIGS. 10A and 10B are timing charts schematically illustrating an operation of the distance measuring apparatus 1b according to the second embodiment. FIG. 9A illustrates an example of a driving method of the distance measuring apparatus 1b in the normal mode which is set when the estrangement period of the image capturing target 11 is less than the first threshold value. In the normal mode, an image including distance information is acquired at a predetermined frame rate that is set by a user or the like in advance. In respective frame periods of the first to the fourth frames illustrated in FIG. 9A, the distance measuring apparatus 1 is driven similarly to the timing chart in FIG. 8. Thereby, even when the moving velocity of the image capturing target 11a is high, the image of the image capturing target 11 can be sufficiently kept.

FIG. 9B illustrates an example of a driving method of the distance measuring apparatus 1b in the power saving mode which is set when the estrangement period of the image capturing target 11 is the first threshold value or more. In the power saving mode, the image including the distance information is acquired at a frame rate slower than the frame rate in the normal mode. In FIG. 9B, a driving frequency of the distance measuring apparatus 1b is made slow to be twice as slow as a driving frequency of the distance measuring apparatus 1b in the normal mode. Thereby, it can reduce the generation load and the processing load of the image including the distance information while acquiring the image of the image capturing target 11.

In the SPAD camera 300, a large reverse bias Bias is applied to bring the photodiode 302 into a Geiger mode, and in addition, a large current flows by avalanche amplification. Consequently, in the SPAD camera 300, large power is consumed each time the reflected light R is detected. In the power saving mode illustrated in FIG. 9B, a frequency at which the light source 301 emits the light pulse F becomes ½, so that a frequency at which the SPAD camera 300 detects the reflected light R and generates avalanche amplification also becomes ½. Accordingly, power consumption of the distance measuring apparatus 1b can be greatly reduced.

However, when an influence of outdoor light by surrounding street lights, sunlight or the like other than the light source 301 is large, the SPAD sensor responds to the outdoor light like this to increase the power consumption of the distance measuring apparatus 1b. This is because avalanche amplification of the SPAD sensor is not only generated due to electrons that are photoexcited, but also generated due to electrons that are thermally excited from a defect level such as dark electrons. A sensor output due to the electrons which are thermally excited like this is detected as a false signal, but generation of an avalanche current increases the power consumption of the distance measuring apparatus 1b.

In FIG. 10B, in the power saving mode, on and off of driving of the SPAD camera 300 are alternately switched at each frame period. More specifically, an odd-numbered frame period in which a bias voltage V2 at which the SPAD sensor is in the Geiger mode is applied, and an even-numbered frame period in which a bias voltage V1 at which the SPAD sensor is not in the Geiger mode is applied are alternately switched. Thereby, in the even-numbered frame period, avalanche amplification does not occur even when outdoor light is large, so that the power consumption of the SPAD camera 300 can be reduced more.

Note that in the power saving mode in FIG. 9B, the driving frequency of the distance measuring apparatus 1 is made slow, whereas in the power saving mode in FIG. 10B, on and off of driving of the distance measuring apparatus 1 are alternately switched at each predetermined period, but it is possible to use these methods in combination. Further, the distance measuring system of the present embodiment may have an image capturing apparatus for capturing an image that includes no distance information, besides the SPAR camera 300.

Third Embodiment

Figure 11:
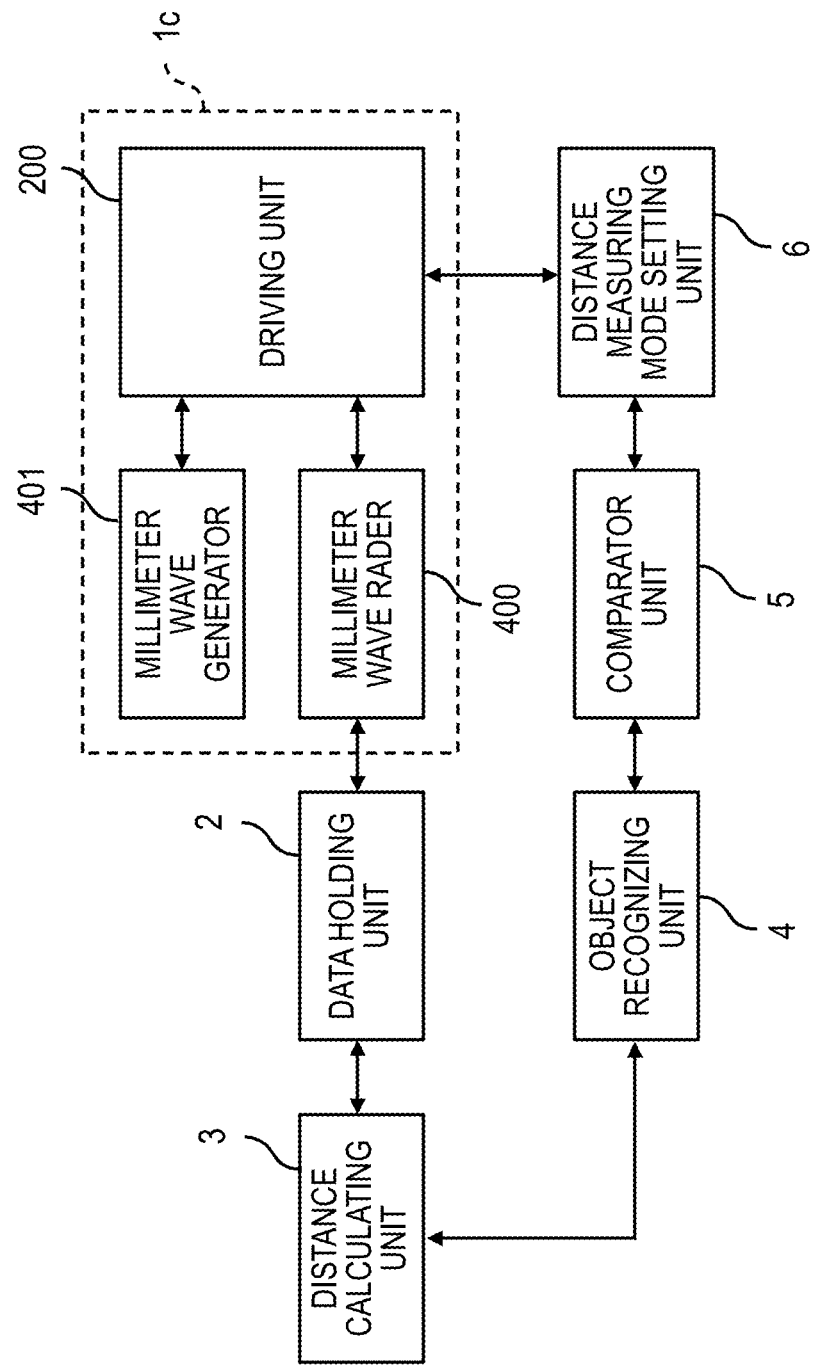
FIG. 11 is a block diagram schematically illustrating a configuration of a distance measuring system according to a third embodiment.

FIG. 11 is a block diagram schematically illustrating a configuration of a distance measuring system according to a third embodiment. The distance measuring system of the present embodiment illustrated in FIG. 11 differs from the distance measuring system of the first embodiment illustrated in FIG. 1 mainly in a configuration of a distance measuring apparatus 1c. The distance measuring apparatus 1c of the present embodiment has a millimeter wave radar 400, a millimeter wave generator 401 and a driving unit 200. The other components are substantially the same as the components in the first embodiment. Further, a control method of the distance measuring system of the present embodiment is also substantially the same as the control method in the flowchart of the first embodiment illustrated in FIG. 2 except that a distance measuring method of the distance measuring apparatus 1c differs from the distance measuring method in the first embodiment. Hereinafter, a difference from the first embodiment will be mainly described.

The millimeter wave generator 401 transmits a radio wave in a millimeter wave band to the image capturing target 11. The millimeter wave radar 400 is a distance measuring camera capable of acquiring an image including distance information, and uses a FMCW (Frequency Modulated Continuous Wave) method that is generally adopted for automotive application, as a distance measuring method. In the pulse radar of the above second embodiment, a delay time period until the reflected wave returns is measured, and the distance from the distance measuring apparatus 1b to the image capturing target 11 is calculated. In contrast with this, in the FMCW radar of the present embodiment, a beat wave that is generated when a transmission wave WF and a reception wave WR are composited is measured, and a distance from the distance measuring apparatus 1c to the image capturing target 11 is calculated. The driving unit 200 drives the millimeter wave generator 401 and the millimeter wave radar 400.

Figure 12:
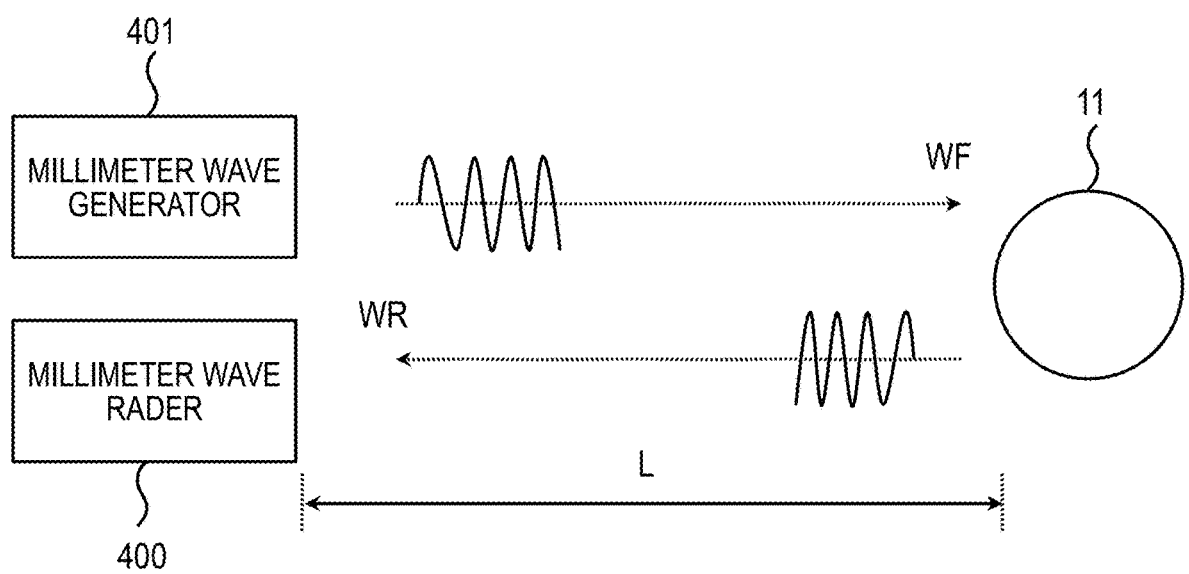
FIG. 12 is a first diagram illustrating a method for measuring a distance to an image capturing target by an FMCW method.

FIG. 12 and FIGS. 13A and 13B are diagrams illustrating a method for measuring the distance to the image capturing target 11 by the FMCW method. As illustrated in FIG. 12, the millimeter wave generator 401 transmits the transmission wave WF in a millimeter wave band toward the image capturing target 11. The millimeter wave radar 400 receives the reception wave WR which is reflected by the image capturing target 11.

FIGS. 13A and 13B illustrate examples of the distance measuring method by the millimeter wave radar 400. In FIG. 13A, a temporal change of a frequency of the transmission wave WF which is subjected to frequency modulation with a frequency f0 as a center is illustrated by a solid line, and a temporal change of a frequency of the reception wave WR which is reflected by the image capturing target 11 is illustrated by a broken line. Further, FIG. 13B illustrates a temporal change of a frequency of the beat wave that is generated by compositing the transmission wave WR and the reception wave WR. Frequencies f1 and f2 of the beat wave illustrated in FIG. 13B satisfy expressions (4) and (5) as follows.

$$f1 = 4\Delta fL/cT + 2f0v/c \quad (4)$$

$$f2 = 4\Delta fL/cT - 2f0v/c \quad (5)$$

Here, a range Δf of modulation of the frequency of the transmission wave WF, a period T of modulation, the distance L to the image capturing target 11, a velocity v of the image capturing target 11 and a velocity c of light are used. From expression (4) and (5) as above, the distance L to the image capturing target 11 and the velocity v of the image capturing target 11 can be obtained by expressions (6) and (7) as follows.

$$L = cT(f1+f2)/8\Delta f \quad (6)$$

$$v = c(f1-f2)/4f0 \quad (7)$$

In the present embodiment, unlike the aforementioned embodiments, the velocity v [m/s] of the image capturing target 11 does not have to be calculated from the change in the distance L to the image capturing target 11, so that it is possible to omit the data holding unit 2. By the configuration like this, a similar effect to the effects of the aforementioned embodiments can be obtained. Note that the distance measuring system of the present embodiment may have an image capturing apparatus for capturing an image that includes no distance information, besides the millimeter wave radar 400.

Fourth Embodiment

Figure 14:
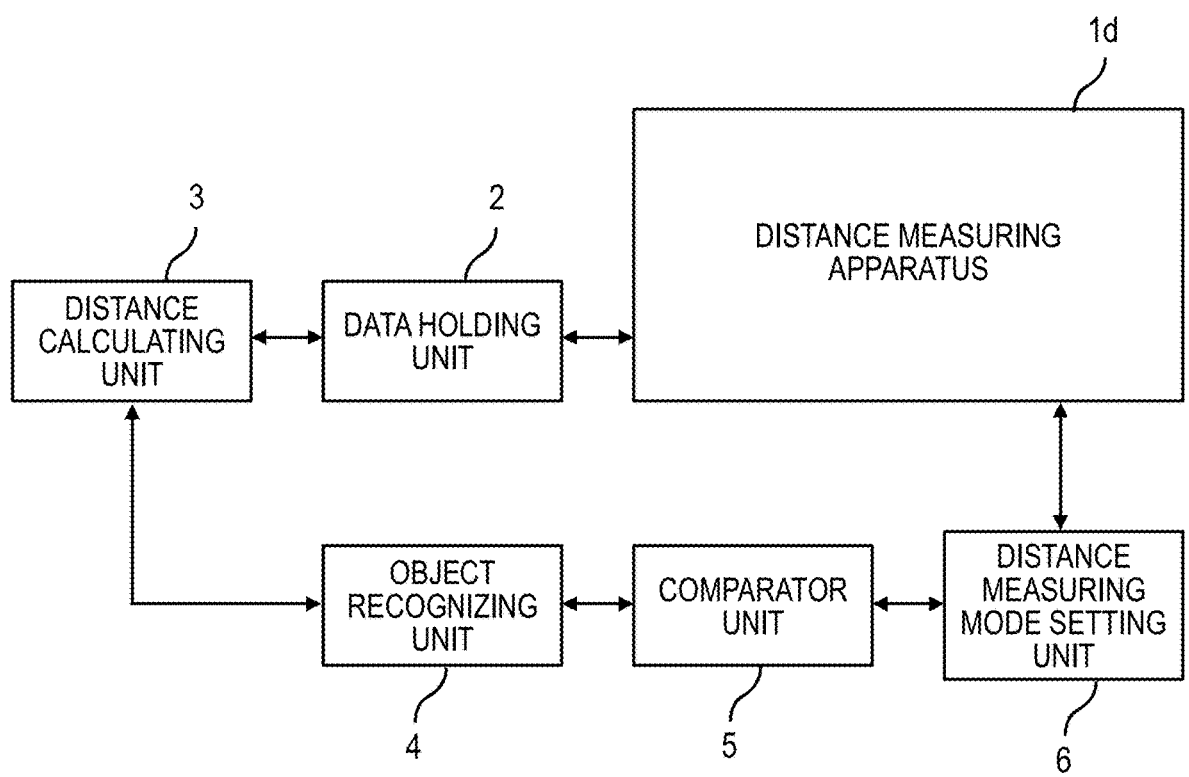
FIG. 14 is a block diagram schematically illustrating a configuration of a distance measuring system according to a fourth embodiment.

FIG. 14 is a block diagram schematically illustrating a configuration of a distance measuring system according to a fourth embodiment. The distance measuring system of the present embodiment illustrated in FIG. 14 differs from the distance measuring systems of the aforementioned embodiments mainly in a configuration of a distance measuring apparatus 1d. The distance measuring apparatus 1d of the present embodiment has two or more of the distance measuring apparatuses 1 to 1c described in the previous first to third embodiments. The other components are substantially the same as the components in the aforementioned embodiments.

As described above, in order to enhance distance measuring precision more in the distance measuring system, it is effective to use the plurality of distance measuring apparatuses 1 to 1c which differ in the distance measuring method, in combination. However, when the plurality of distance measuring apparatuses 1 to 1c are used in combination, the generation load and processing load of the image including the distance information increase to cause an increase in power consumption.

Therefore, in the present embodiment, an image including the distance information is acquired by using the distance measuring apparatus 1d having two or more of the distance measuring apparatuses 1 to 1c described in the preceding first to third embodiments, and the flowchart illustrated in FIG. 2 is applied to the distance measuring apparatus 1d. That is, when the estrangement period of the image capturing target 11 is the predetermined first threshold value or more, the acquiring frequency of the image is made lower than the acquiring frequency in the normal mode to set the distance measuring apparatus 1 to the power saving mode.

According to the configuration like this, even when the distance information is acquired by using the plurality of distance measuring apparatuses 1 to 1c differing in the distance measuring method, in combination, the power consumption of the distance measuring apparatus 1 can be reduced while the distance measuring precision is further enhanced. Note that the power saving mode of the present embodiment can be the mode that realizes any one or more of the power saving modes described in the first to the third embodiments.

Fifth Embodiment

Figure 15:
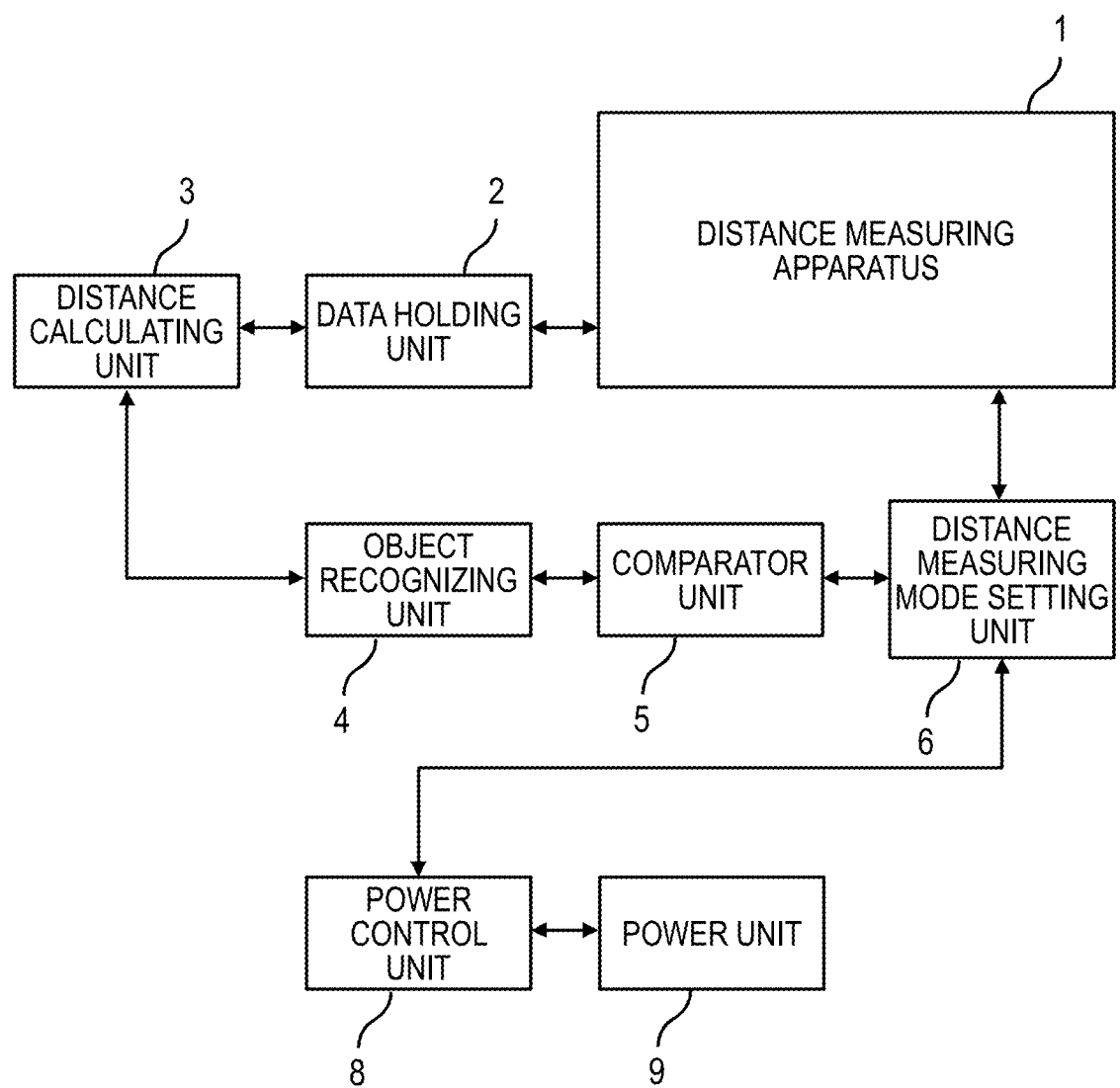
FIG. 15 is a block diagram schematically illustrating a configuration of a distance measuring system according to a fifth embodiment.

FIG. 15 is a block diagram schematically illustrating a configuration of a distance measuring system according to a fifth embodiment. The distance measuring system of the present embodiment illustrated in FIG. 15 further includes a power controlling unit 8 and a power unit 9, in addition to the distance measuring system of the first embodiment illustrated in FIG. 1. The power unit 9 drives and moves a vehicle on which the distance measuring apparatus 1 is mounted. The power controlling unit 8 controls a moving velocity of the vehicle on which the distance measuring apparatus 1 is mounted, via the power unit 9. The other components are substantially the same as those in the first embodiment. Note that the distance measuring apparatus 1 of the present embodiment may be any one of the distance measuring apparatuses 1 to 1d described in the aforementioned embodiments, but is simplified and described as the distance measuring apparatus 1 in the present embodiment.

Figure 16:
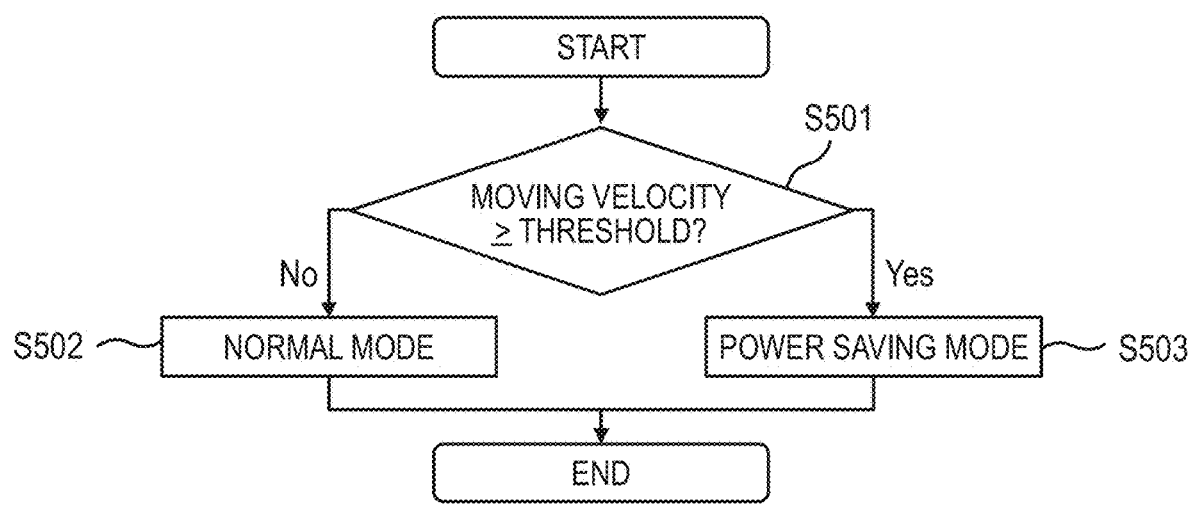
FIG. 16 is a flowchart illustrating a control method of the distance measuring system according to the fifth embodiment.

FIG. 16 is a flowchart illustrating a control method of a distance measuring system according to the fifth embodiment. The distance measuring system of the present embodiment controls the distance measuring system according to the flowchart illustrated in FIG. 16 in addition to the flowchart illustrated in FIG. 2.

In step S501, the power controlling unit 8 determines whether or not the moving velocity of the vehicle on which the distance measuring system is mounted is less than a predetermined second threshold value. When the moving velocity is less than the second threshold value (Yes), the flow goes to step S503, and when the moving velocity is the second threshold value or more (No), the flow goes to step S502.

In step S503, the distance measuring mode setting unit 6 determines that the image capturing target 11 relatively moves at a low velocity with respect to the distance measuring apparatus 1 and there is no risk of the image capturing target 11 immediately becoming unrecognizable in the field region of view of the stereo camera 100. Subsequently, the distance measuring mode setting unit 6 sets the operation mode of the distance measuring apparatus 1 to the power saving mode.

In step S502, the distance measuring mode setting unit 6 determines that the image capturing target 11 relatively moves at a high velocity with respect to the distance measuring apparatus 1 and the image capturing target 11 is becoming unrecognizable in the field region of view of the stereo camera 100. Subsequently, the distance measuring mode setting unit 6 keeps the operation mode of the distance measuring apparatus 1 as it is in the normal mode.

At this time, the determination processing based on the estrangement period of the image capturing target 11 as illustrated in FIG. 2, and the determination processing based on the moving velocity of the vehicle as illustrated in FIG.

16 may be performed in combination. Thereby, the power consumption of the distance measuring apparatus 1 can be further reduced.

Figure 17:
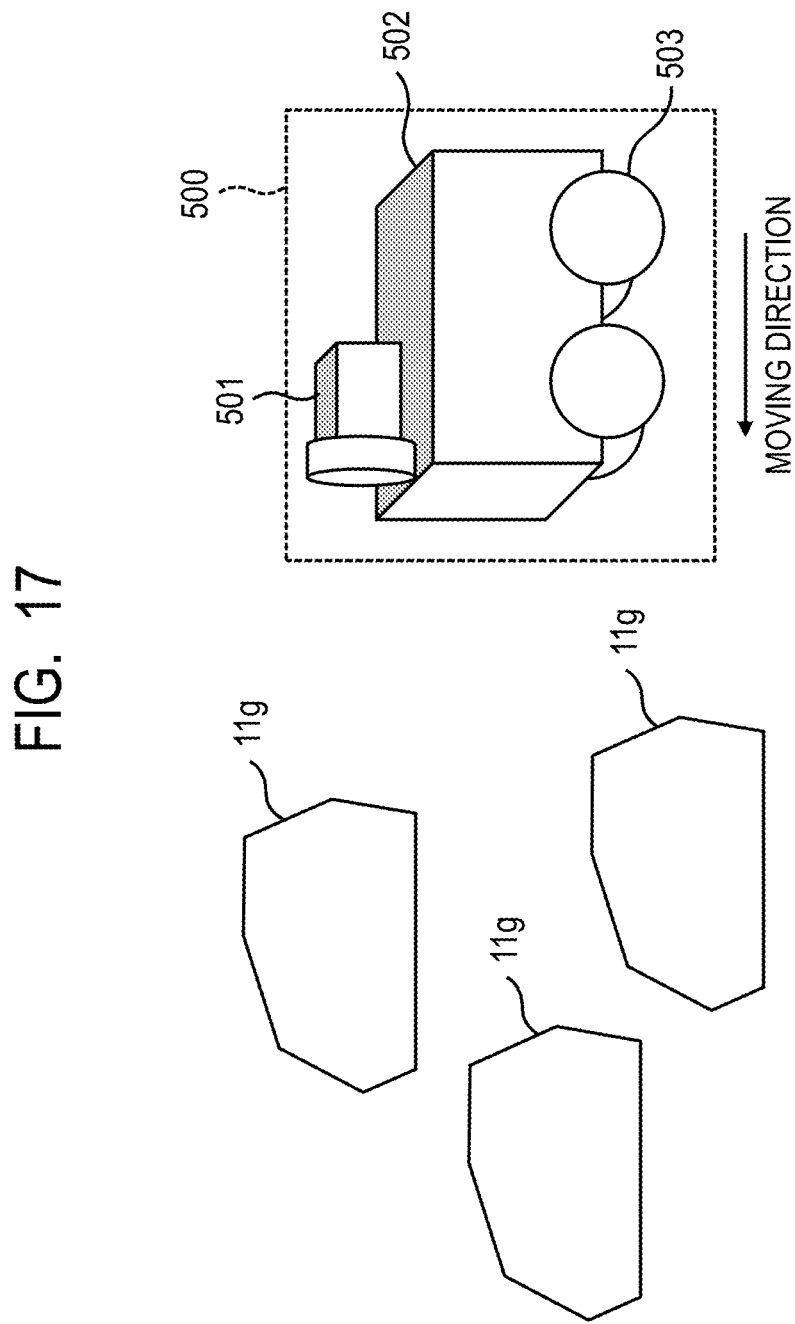
FIG. 17 is a view illustrating an application example of the distance measuring system according to the fifth embodiment.

FIG. 17 is a view illustrating an application example of the distance measuring system according to the fifth embodiment. FIG. 17 illustrates a self-propelled robot 500 to which the distance measuring system of the present embodiment is applied. The self-propelled robot 500 is configured by including a distance measuring system 501, a body 502 of the robot, and a wheel 503 for moving the body 502. The power unit 9 that drives the wheel 503, and the power controlling unit 8 that controls the power unit 9 are contained in the body 502 of the robot.

FIG. 17 assumes a situation where the self-propelled robot 500 performs a rescue activity in a disaster site where people cannot enter. The self-propelled robot 500 is assumed to be running at a speed of 5 km per hour, for example, in a disaster site where the image capturing targets 11g which are obstacles such as rubble are scattered. In the situation like this, unlike the preceding first embodiment, the self-propelled robot 500 on which the distance measuring apparatus 1 is mounted moves relatively to the image capturing targets 11g which are stationary. A relative velocity is a speed of 5 km per hour which is the same as the traveling velocity of the self-propelled robot 500.

In the self-propelled robot 500 which is traveling at a speed of 5 km per hour, a length of a time period in which the image of the image capturing targets 11g can be acquired is double, as compared with the case where the self-propelled robot 500 is traveling at a speed of 10 km per hour which is twice as fast as 5 km per hour, for example. That is, a two-fold difference is generated in the amount of data of the image which is acquired by the distance measuring apparatus 1 to recognize the image capturing targets 11g.

It is not desirable to keep the acquiring frequency of the image high in the situation where the traveling velocity of the self-propelled robot 500 is low like this, because the power for acquiring and generating the image including the distance information is consumed more than necessary. In particular, the self-propelled robot 500 generally obtains a power source from an internal battery. Because the internal battery capacity is limited, it is desirable that the power consumed in the distance measuring system is reduced as much as possible.

Therefore, in the present embodiment, the acquiring frequency of the image is made slower than the acquiring frequency in the normal mode when the moving velocity of the vehicle on which the distance measuring apparatus 1 is mounted is less than the predetermined second threshold value. Thereby, the power consumption of the distance measuring apparatus 1 can be reduced. Note that in FIG. 17, the example of the self-propelled robot 500 which has the wheel 503 and travels on the land is cited, but a large-sized vehicle such as a car may be adopted in place of the self-propelled robot 500, or a flying object having a propeller or the like and flying in the sky may be adopted.

Sixth Embodiment

Figure 18:
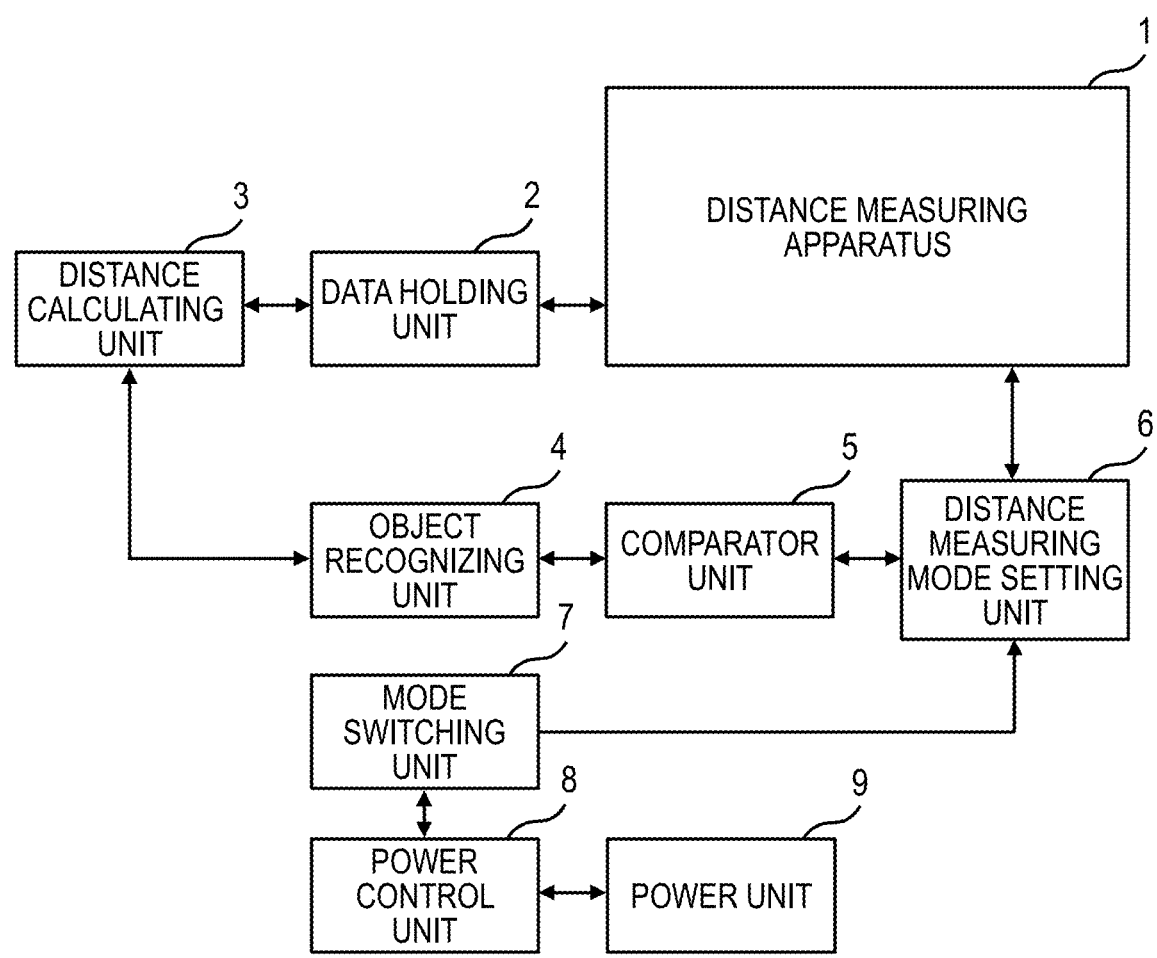
FIG. 18 is a block diagram schematically illustrating a configuration of a distance measuring system according to a sixth embodiment.

FIG. 18 is a block diagram schematically illustrating a configuration of a distance measuring system according to a sixth embodiment. The distance measuring system of the present embodiment illustrated in FIG. 18 further includes a mode switching unit 7 in addition to the distance measuring system of the fifth embodiment illustrated in FIG. 15. The mode switching unit 7 switches the distance measuring system to a first mode and a second mode according to a set velocity of a vehicle which is set by the power controlling unit 8.

Here, the first mode is a mode in which shift to the power saving mode is not performed, and is a mode in which the distance measuring apparatus 1 is always set to the normal mode irrespective of the estrangement period which is estimated based on the distance information included in the image. The second mode is a mode in which shift to the power saving mode is enabled, and is a mode in which the distance measuring apparatus 1 is set to the power saving mode according to the estrangement period of the image capturing target 11, as described in the preceding first to fifth embodiments.

The first mode is effective in a case where it is better not to perform shift to the power saving mode irrespective of the estrangement period from a viewpoint of safety, in a case where the vehicle on which the distance measuring system is mounted is traveling on an ordinary road such as a residential street. The second mode is effective in a case where the power consumption of the distance measuring apparatus 1 is desired to be reduced as described in the preceding first to fifth embodiments. The other components are substantially the same as the components in the fifth embodiment. Note that the distance measuring apparatus 1 of the present embodiment may be any one of the distance measuring apparatuses 1 to 1d described in the aforementioned embodiments, but is simplified and described as the distance measuring apparatus 1 in the present embodiment.

Figure 19:
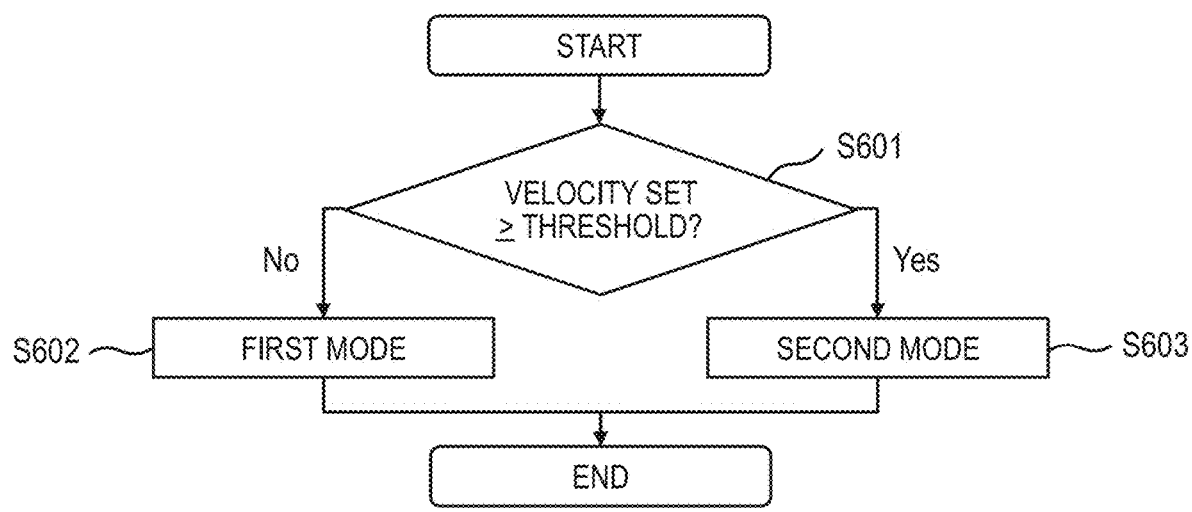
FIG. 19 is a flowchart illustrating a control method of the distance measuring system according to the sixth embodiment.

FIG. 19 is a flowchart illustrating a control method of the distance measuring system according to the sixth embodiment. The distance measuring system of the present embodiment controls the distance measuring system according to the flowchart illustrated in FIG. 19 in addition to the flowchart illustrated in FIG. 2.

In step S601, the mode switching unit 7 determines whether or not a set velocity of the vehicle which is set by the power controlling unit 8 is a predetermined third threshold value or more. Here, the power controlling unit 8 controls the velocity of the vehicle on which the distance measuring system is mounted so that the velocity of the vehicle becomes the set velocity. When the set velocity is the third threshold value or more (Yes), the flow goes to step S603, and when the set velocity is less than the third threshold value (No), the flow goes to step S602. In step S603, the mode switching unit 7 sets the distance measuring system to the second mode. In step S602, the mode switching unit 7 sets the distance measuring system to the first mode.

Figure 20A:
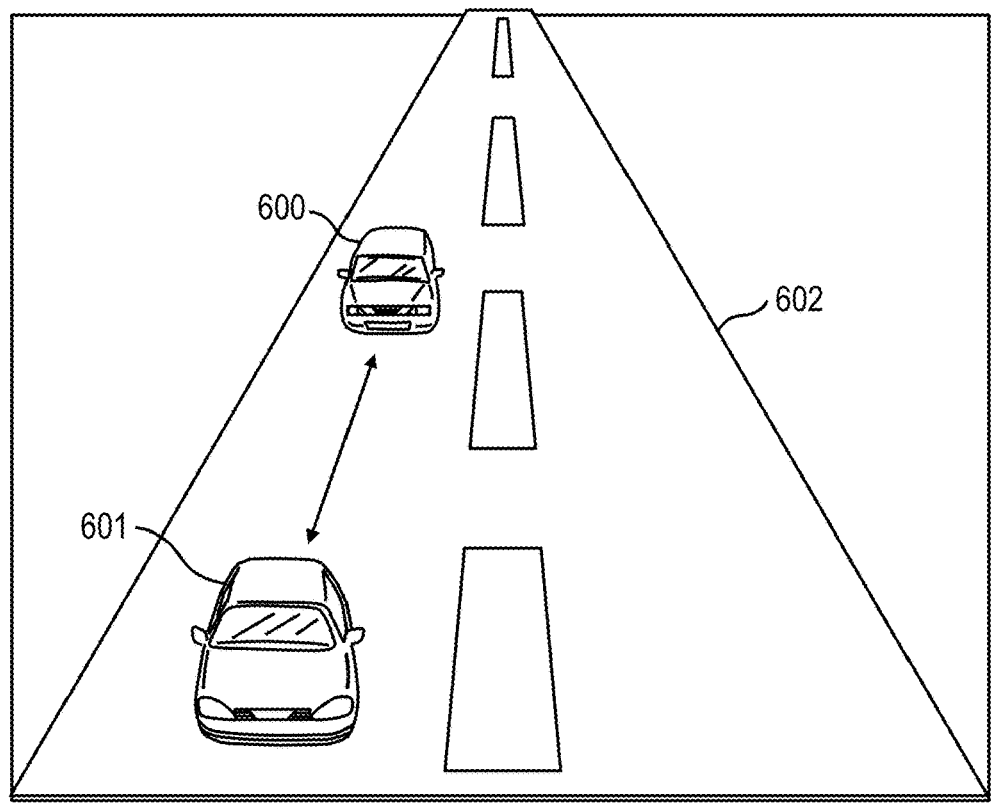
FIGS. 20A and 20B are views illustrating application examples of the distance measuring system according to the sixth embodiment.
Figure 20B:
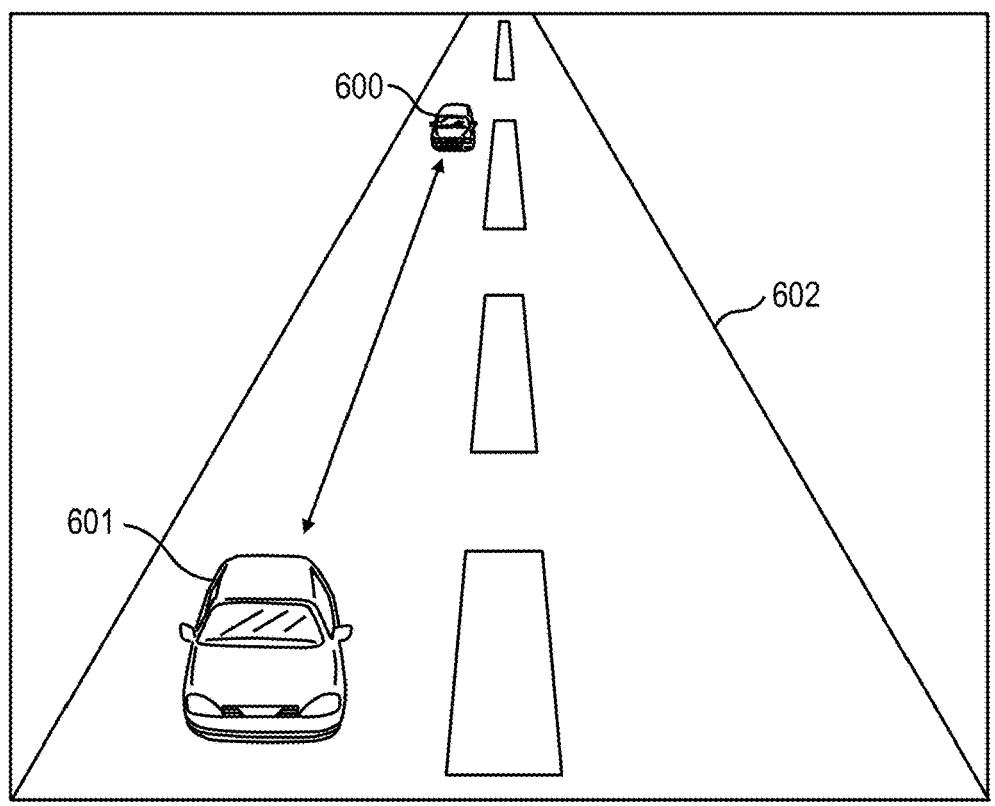

FIGS. 20A and 20B are views illustrating application examples of the distance measuring system according to the sixth embodiment. FIGS. 20A and 20B each illustrate a vehicle 600 to which the distance measuring system of the present embodiment is applied. Another vehicle 601 travels in front of the vehicle 600 which is traveling on a road 602. Here, a relative velocity of the vehicle 601 to the vehicle 600 is assumed to be lower as compared with a travel velocity of the vehicle 600 itself.

FIG. 20A illustrates an example of a case where an inter-vehicle interval to the vehicle 601 in front is relatively small as in a case where the vehicle 600 is traveling on an ordinary road, for example. If the acquiring frequency of the image is made slow in a situation as illustrated in FIG. 20A, a response is likely to be delayed when the vehicle 601 traveling in front stops suddenly or makes a sudden steering, so that it is desirable to always keep the operation mode of the distance measuring apparatus 1 to the normal mode from the viewpoint of safety.

FIG. 20B illustrates an example of a case where the inter-vehicle interval to the vehicle 601 in front is relatively large as in a case where the vehicle 600 is traveling on a highway, for example. In the situation as illustrated in FIG. 20B, a following distance from the vehicle 601 in front is sufficiently ensured and no signal is on the highway, so that there is little risk that the situation around the vehicle 601 traveling in front changes suddenly. Therefore, the operation mode of the distance measuring apparatus 1 is set to the power saving mode according to the estrangement period estimated based on the distance information included in the image, and the power consumption of the distance measuring apparatus 1 is reduced.

In recent years, the number of automobiles using motors as part of power has been increasing. The automobile is loaded with a battery that drives the motor. A capacity of the battery directly links to a traveling distance of an automobile, so that it is not preferable to consume power other than power for driving the motor more than necessary.

Further, a technique of the system performing part of driving control of an automobile instead of a human is developed (an automatic driving technique). In the automatic driving technique, the distance measuring system is indispensable for grasping the situation around one's own vehicle. However, the distance measuring system performs a part that is judged by a human, so that it is inevitable that the amount of data processed inside the vehicle including systems other than the distance measuring system increases.

Therefore, according to the configuration of the present embodiment, the power consumption of the distance measuring apparatus 1 is reduced and the traveling distance of an automobile can be increased while safety is taken into consideration. Note that it is desirable that the aforementioned first to third threshold values are set with safety of the automobile taken into consideration. Further, in the present embodiment, the example of the case of measuring the distance to the vehicle 601 which is present in front of the vehicle 600 is cited, but it is also possible to measure the distance to the image capturing target 11 which is present outside the front of the vehicle 600 by using a similar method.

Seventh Embodiment

Figure 21:
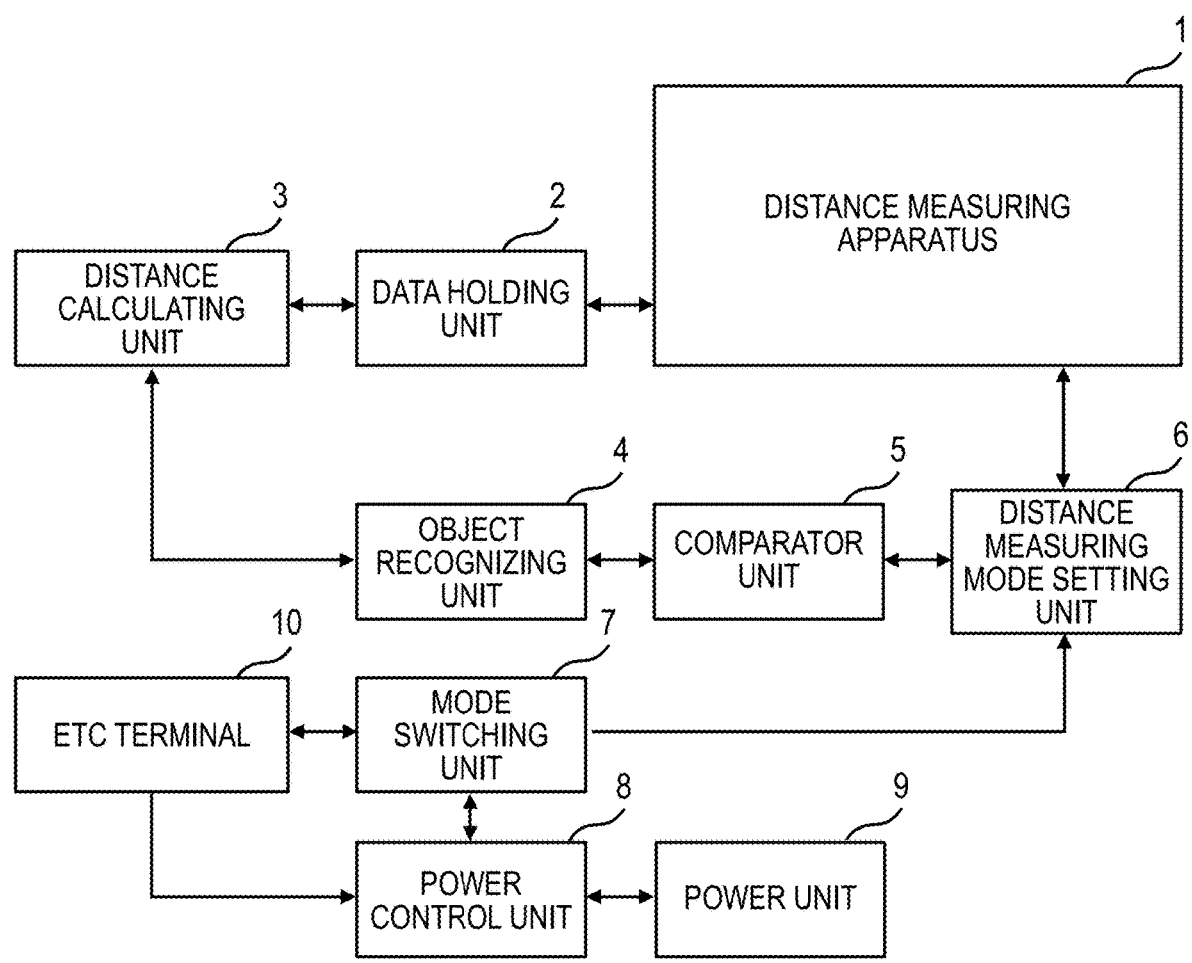
FIG. 21 is a block diagram schematically illustrating a configuration of the distance measuring system according to the sixth embodiment.

FIG. 21 is a block diagram schematically illustrating a configuration of a distance measuring system according to a seventh embodiment. The distance measuring system of the present embodiment illustrated in FIG. 21 further includes an ETC (Electronic Toll Collection) terminal 10, in addition to the distance measuring system of the sixth embodiment illustrated in FIG. 18. The ETC terminal 10 detects whether or not the vehicle 600 is traveling on a highway based on whether or not a toll is charged, for example. The other components are substantially the same as the components in the sixth embodiment. Note that the distance measuring apparatus 1 of the present embodiment may be any one of the distance measuring apparatuses 1 to 1*d* which are described in the aforementioned embodiments, but is simplified and described as the distance measuring apparatus 1 in the present embodiment.

Figure 22:
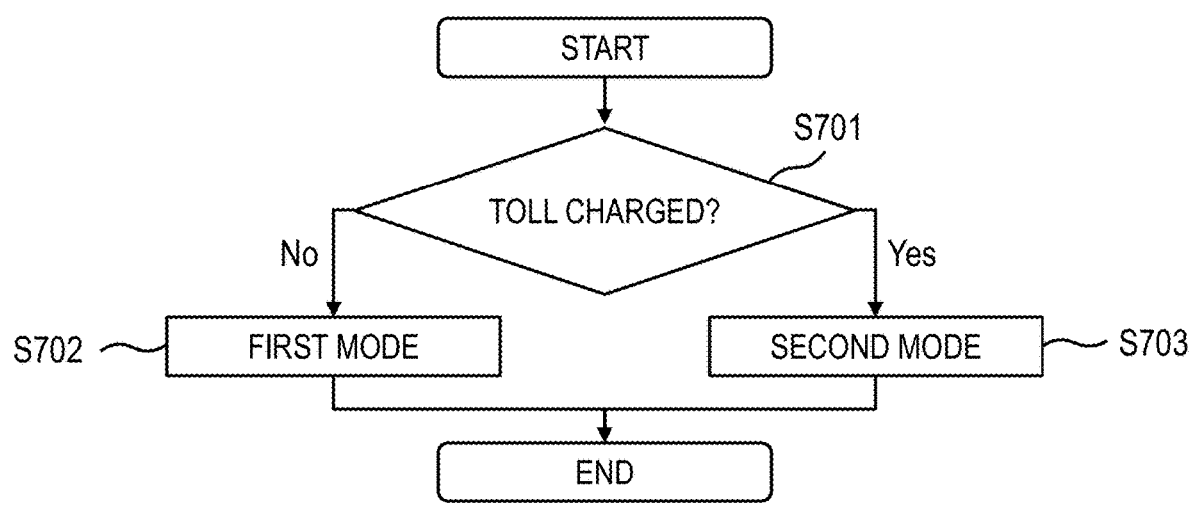
FIG. 22 is a flowchart illustrating a control method of a distance measuring system according to a seventh embodiment.

FIG. 22 is a flowchart illustrating a control method of the distance measuring system according to the seventh embodiment. The distance measuring system of the present embodiment controls the distance measuring system according to the flowchart illustrated in FIG. 22 in addition to the flowchart illustrated in FIG. 2. In the sixth embodiment, the first mode and the second mode are switched according to the set velocity of the vehicle which is set by the power controlling unit 8. In contrast with this, in the present embodiment, the first mode and the second mode are switched according to whether the vehicle 600 is traveling on a highway or not.

In step S701, the mode switching unit 7 determines whether or not the vehicle 600 is traveling on a highway based on whether or not a toll is charged, for example. When a toll is charged (Yes), the flow goes to step S703, and when a toll is not charged (No), the flow goes to step S702.

In step S703, the mode switching unit 7 determines that the vehicle 600 is traveling on a highway, and sets the distance measuring system to the second mode. In step S702, the mode switching unit 7 determines that the vehicle 600 is not traveling on a highway, and sets the distance measuring system to the first mode. As described above, at a time of traveling on a highway, a change in the situation around the vehicle 600 is smaller as compared with a time of traveling on an ordinary road such as a residential street. Accordingly, when the vehicle 600 is traveling on a highway, the distance measuring system is set to the second mode, whereby the power consumption of the distance measuring apparatus 1 is reduced, and the traveling distance of the automobile can be increased while safety is taken into consideration.

Other Embodiments

Note that the aforementioned embodiments each only illustrate an example of an embodiment in carrying out the present invention, and the technical range of the present invention should not be interpreted limitedly by these embodiments. That is, the present invention can be carried out in various forms without departing from the technical idea or main features of the present invention. For example, it is possible to apply the configurations of the aforementioned respective embodiments in combination. Further, the distance measuring systems of the aforementioned embodiments correspond to distance measurement in a three-dimensional space as described in the first embodiment. Consequently, a function of separating the distance and the velocity of the image capturing target 11 spatially may be included.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)$^T$n, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-120249, filed Jun. 20, 2017, which is hereby incorporated by reference herein in its entirety.

What is claimed is:

1. A distance measuring system, comprising:
a distance measuring apparatus that acquires distance information concerning an image capturing target, the distance measuring apparatus comprising:
one or more processors; and
a memory storing instructions which, when the instructions are executed by the one or more processors, cause the distance measuring apparatus to function as:
a calculating unit that estimates an estrangement period in which the image capturing target cannot be recognized in an image within a field region of view of the distance measuring system, based on the distance information; and
a controlling unit that sets the distance measuring apparatus to a power saving mode of controlling an acquiring frequency of the image according to the estrangement period when the estrangement period is a first threshold value or more, and sets the distance measuring apparatus to a normal mode of controlling the acquiring frequency of the image independently from the estrangement period when the estrangement period is less than the first threshold value.

2. The distance measuring system according to claim 1, wherein the controlling unit makes a driving frequency of the distance measuring apparatus in the power saving mode slower than a driving frequency of the distance measuring apparatus in the normal mode.

3. The distance measuring system according to claim 1, wherein the controlling unit alternately switches on and off of driving of the distance measuring apparatus in a predetermined period in the power saving mode.

4. The distance measuring system according to claim 1, wherein the distance measuring apparatus acquires the distance information by using parallax.

5. The distance measuring system according to claim 1, wherein the distance measuring apparatus acquires the distance information by a TOF (Time-of-flight) method.

6. The distance measuring system according to claim 5, wherein the distance measuring apparatus detects reflected light from the image capturing target by using a SPAD (Single Photon Avalanche Diode) sensor, and calculates a distance to the image capturing target.

7. The distance measuring system according to claim 6, wherein in the power saving mode, the distance measuring apparatus alternately applies a bias voltage V2 at which the SPAD sensor is in a Geiger mode, and a bias voltage V1 at which the SPAD sensor is not in the Geiger mode, to the SPAD sensor in a predetermined period.

8. The distance measuring system according to claim 1, wherein the distance measuring apparatus acquires the distance information by using a radio wave in a millimeter wave band.

9. The distance measuring system according to claim 8, wherein the distance measuring apparatus acquires a distance to the image capturing target and a velocity by a FMCW (Frequency Modulated Continuous Wave) method.

10. The distance measuring system according to claim 1, wherein the distance information is acquired by using a plurality of the distance measuring apparatuses that differ in distance measuring method, in combination.

11. The distance measuring system according to claim 1, wherein the distance measuring apparatus is mounted on a vehicle, and the controlling unit sets the distance measuring apparatus to the power saving mode when a moving velocity of the vehicle is less than a second threshold value.

12. The distance measuring system according to claim 1, wherein the distance measuring apparatus is mounted on a vehicle,
the distance measuring system comprising a switching unit that switches between a first mode of setting the distance measuring apparatus to the normal mode irrespective of the estrangement period, and a second mode of setting the distance measuring apparatus to the power saving mode according to the estrangement period,
wherein the switching unit switches to the second mode when a set velocity of the vehicle is a third threshold value or more, and switches to the first mode when the set velocity of the vehicle is less than the third threshold value.

13. The distance measuring system according to claim 12, comprising an ETC terminal,
wherein the switching unit switches to the second mode when the switching unit detects that the vehicle is traveling on a highway by the ETC terminal.

14. A vehicle loaded with a distance measuring system comprising:
a distance measuring apparatus that acquires distance information concerning an image capturing target, the distance measuring apparatus comprising:
one or more processors; and
a memory storing instructions which, when the instructions are executed by the one or more processors, cause the distance measuring apparatus to function as:
a calculating unit that estimates an estrangement period in which the image capturing target cannot be recognized in an image within a field region of view of the distance measuring system, based on the distance information; and
a controlling unit that sets the distance measuring apparatus to a power saving mode of controlling an acquiring frequency of the image according to the estrangement period when the estrangement period is a first threshold value or more, and sets the distance measuring apparatus to a normal mode of controlling the acquiring frequency of the image independently from the estrangement period when the estrangement period is less than the first threshold value, wherein the controlling unit sets the distance measuring apparatus to the power saving mode when a moving velocity of the vehicle is less than a second threshold value.

15. A control method of a distance measuring system including a distance measuring apparatus that acquires distance information concerning an image capturing target, comprising:

estimating an estrangement period in which the image capturing target cannot be recognized in an image within a field region of view of the distance measuring system, based on the distance information; and setting the distance measuring apparatus to a power saving mode of controlling an acquiring frequency of the image according to the estrangement period when the estrangement period is a first threshold value or more, and setting the distance measuring apparatus to a normal mode of controlling the acquiring frequency of the image independently from the estrangement period, when the estrangement period is less than the first threshold value, wherein the method is executed by at least one processor of the distance measuring system.

* * * * *